United States Patent
Swiegers et al.

(10) Patent No.: US 10,297,834 B2
(45) Date of Patent: May 21, 2019

(54) METHOD AND ELECTROCHEMICAL CELL FOR MANAGING ELECTROCHEMICAL REACTIONS

(71) Applicant: AquaHydrex Pty Ltd, North Wollongong (AU)

(72) Inventors: Gerhard Frederick Swiegers, Woonona (AU); Andrew Nattestad, Fairy Meadow (AU); Dennis Antiohos, Fairy Meadow (AU); Fletcher William Thompson, Coniston (AU); Stephen Thomas Beirne, Farmborough Heights (AU); Steven DuWayne Kloos, Naperville, IL (US); Paul Brendan Denis Michael Barrett, Kenmore (AU)

(73) Assignee: AQUAHYDREX PTY LTD, North Wollongong (AU)

( * ) Notice: Subject to any disclaimer, the term of this patent is extended or adjusted under 35 U.S.C. 154(b) by 403 days.

(21) Appl. No.: 14/908,334

(22) PCT Filed: Jul. 30, 2014

(86) PCT No.: PCT/AU2014/050158
§ 371 (c)(1),
(2) Date: Jan. 28, 2016

(87) PCT Pub. No.: WO2015/013764
PCT Pub. Date: Feb. 5, 2015

(65) Prior Publication Data
US 2016/0164120 A1 Jun. 9, 2016

(30) Foreign Application Priority Data

Jul. 31, 2013 (AU) ............................... 2013902844
Dec. 10, 2013 (AU) ............................... 2013904802

(Continued)

(51) Int. Cl.
*H01M 4/86* (2006.01)
*C25B 15/02* (2006.01)
(Continued)

(52) U.S. Cl.
CPC ............. *H01M 4/8626* (2013.01); *C25B 1/13* (2013.01); *C25B 1/14* (2013.01); *C25B 1/245* (2013.01);
(Continued)

(58) Field of Classification Search
CPC ............. H01M 4/8626; H01M 4/8807; H01M 8/04104; C25B 15/02
(Continued)

(56) References Cited

U.S. PATENT DOCUMENTS 3,284,243 A 11/1966 Von Sturm
3,553,029 A 1/1971 Kordesch et al.
(Continued)

FOREIGN PATENT DOCUMENTS

CA 2238738 6/1997
DE 29823321 8/1999
(Continued)

OTHER PUBLICATIONS

Winther-Jensen et al., "Towards hydrogen production using a breathable electrode structure to directly separate gases in the water splitting reaction," International Journal of Hydrogen Energy, May 2012, pp. 8185-8189, vol. 37, No. 10, Elsevier Ltd.

*Primary Examiner* — James M Erwin
(74) *Attorney, Agent, or Firm* — Knobbe Martens Olson and Bear LLP

(57) ABSTRACT

A method and/or electrochemical cell for utilizing one or more gas diffusion 5 electrodes (GDEs) in an electrochemical cell, the one or more gas diffusion electrodes have a wetting pressure and/or a bubble point exceeding 0.2 bar.

(Continued)

The one or more gas diffusion electrodes can be subjected to a pressure differential between a liquid side and a gas side. A pressure on the liquid side of the GDE over the gas side does not exceed the wetting pressure of the GDE during operation (in cases where a liquid electrolyte side has higher pressure), and/or a pressure on the gas side of the GDE over the liquid side, does not exceeds the bubble point of the GDE (in cases where the gas side has the higher pressure).

32 Claims, 10 Drawing Sheets

(30) Foreign Application Priority Data

| Dec. 10, 2013 | (AU) | 2013904803 |
|---|---|---|
| Dec. 10, 2013 | (AU) | 2013904804 |
| Dec. 10, 2013 | (AU) | 2013904806 |

(51) Int. Cl.

| C25C 7/00 | (2006.01) |
|---|---|
| C25B 9/08 | (2006.01) |
| H01M 8/04089 | (2016.01) |
| C25B 1/13 | (2006.01) |
| C25B 1/14 | (2006.01) |
| C25B 1/24 | (2006.01) |
| C25B 1/26 | (2006.01) |
| C25B 1/30 | (2006.01) |
| C25B 3/00 | (2006.01) |
| C25B 11/03 | (2006.01) |
| H01M 8/08 | (2016.01) |
| H01M 4/88 | (2006.01) |
| H01M 8/083 | (2016.01) |

(52) U.S. Cl.
CPC .......... *C25B 1/26* (2013.01); *C25B 1/265* (2013.01); *C25B 1/30* (2013.01); *C25B 3/00* (2013.01); *C25B 9/08* (2013.01); *C25B 11/035* (2013.01); *C25B 15/02* (2013.01); *C25C 7/00* (2013.01); *H01M 4/8605* (2013.01); *H01M 4/8807* (2013.01); *H01M 8/04104* (2013.01); *H01M 8/08* (2013.01); *H01M 8/083* (2013.01); *H01M 2300/0011* (2013.01); *Y02E 60/366* (2013.01)

(58) Field of Classification Search
USPC .................................. 429/446, 516
See application file for complete search history.

(56) References Cited

U.S. PATENT DOCUMENTS

| 3,697,410 | A | 10/1972 | Johnson et al. |
|---|---|---|---|
| 3,854,994 | A | 12/1974 | Binder et al. |
| 3,923,629 | A | 12/1975 | Shaffer |
| 4,568,442 | A | 2/1986 | Goldsmith |
| 4,581,116 | A | 4/1986 | Plowman et al. |
| 4,586,999 | A | 5/1986 | Goldsmith et al. |
| 4,722,773 | A | 2/1988 | Plowman et al. |
| 4,790,915 | A | 12/1988 | Winsel et al. |
| 4,865,925 | A | 9/1989 | Ludwig et al. |
| 5,242,765 | A | 9/1993 | Naimer et al. |
| 5,300,206 | A | 4/1994 | Allen et al. |
| 5,336,570 | A | 8/1994 | Dodge |
| 5,376,253 | A | 12/1994 | Rychen et al. |
| 5,396,253 | A | 3/1995 | Chia |
| 5,423,967 | A | 6/1995 | Kunimatsu et al. |
| 5,538,608 | A | 7/1996 | Furuya |
| 6,203,676 | B1 | 3/2001 | Phillips et al. |
| 6,368,473 | B1 | 4/2002 | Furuya et al. |
| 6,733,639 | B2 | 5/2004 | Busse et al. |
| 7,229,944 | B2 | 6/2007 | Shao-Horn et al. |
| 7,326,329 | B2 | 2/2008 | Gomez |
| 7,651,602 | B2 | 1/2010 | Helmke et al. |
| 2002/0150812 | A1 | 10/2002 | Kaz et al. |
| 2003/0035990 | A1 | 2/2003 | Washima |
| 2005/0036941 | A1 | 2/2005 | Bae et al. |
| 2005/0106450 | A1 | 5/2005 | Castro et al. |
| 2005/0208366 | A1 | 9/2005 | Rohwer et al. |
| 2007/0131556 | A1 | 6/2007 | Lambie |
| 2007/0246351 | A1 | 10/2007 | Smola et al. |
| 2008/0070076 | A1 | 3/2008 | Makita et al. |
| 2008/0155813 | A1 | 7/2008 | Dopp et al. |
| 2009/0078568 | A1 | 3/2009 | Ramaswami et al. |
| 2009/0101521 | A1 | 4/2009 | Bayer et al. |
| 2009/0162714 | A1 | 6/2009 | Nakanishi et al. |
| 2009/0165933 | A1 | 7/2009 | Losch et al. |
| 2009/0233153 | A1 | 9/2009 | Carlisle et al. |
| 2009/0272648 | A1 | 11/2009 | Pratt |
| 2009/0305084 | A1 | 12/2009 | Crookes et al. |
| 2010/0314261 | A1 | 12/2010 | Perry |
| 2011/0229790 | A1 | 9/2011 | Sato et al. |
| 2011/0253526 | A1 | 10/2011 | McAlister |
| 2012/0021303 | A1 | 1/2012 | Amendola et al. |
| 2012/0115049 | A1* | 5/2012 | Rinzler ............... H01M 4/8605 429/405 |
| 2012/0149789 | A1 | 6/2012 | Greenbaum |
| 2012/0308807 | A1 | 12/2012 | Edwards |
| 2013/0017414 | A1 | 1/2013 | He |
| 2013/0078536 | A1* | 3/2013 | Bulan .................. C25B 11/035 429/405 |
| 2013/0092532 | A1 | 4/2013 | Monzyk et al. |
| 2013/0183591 | A1 | 7/2013 | Dickson |
| 2013/0189592 | A1 | 7/2013 | Roumi et al. |
| 2013/0209919 | A1 | 8/2013 | Amendola et al. |

FOREIGN PATENT DOCUMENTS

| EP | 1449292 | 8/2004 |
|---|---|---|
| EP | 1658652 | 1/2011 |
| GB | 1542690 | 3/1979 |
| JP | 2004-250736 | 9/2004 |
| WO | WO 2002/014224 | 2/2002 |
| WO | WO 2003/035939 | 5/2003 |
| WO | WO 2003/042430 | 5/2003 |
| WO | WO 2003/047011 | 6/2003 |
| WO | WO 2009/015127 | 1/2009 |
| WO | WO 2011/089904 | 7/2011 |
| WO | WO 2011/094295 | 8/2011 |
| WO | WO 2011/146558 | 11/2011 |
| WO | WO 2012/012558 | 1/2012 |
| WO | WO 2012/021550 | 2/2012 |
| WO | WO 2012/075546 | 6/2012 |
| WO | WO 2012/122600 | 9/2012 |
| WO | WO 2013/037902 | 3/2013 |
| WO | WO 2013/185170 | 12/2013 |
| WO | WO 2014/088628 | 6/2014 |

* cited by examiner

METHOD AND ELECTROCHEMICAL CELL FOR MANAGING ELECTROCHEMICAL REACTIONS

TECHNICAL FIELD

The present invention relates to the management of electrochemical reactions that involve the simultaneous presence of liquids and gases, as reactants or products. Example embodiments relate to methods, cells or devices that facilitate or assist in managing such electrochemical reactions.

BACKGROUND

Numerous electrochemical processes involve gas-to-liquid or liquid-to-gas transformations. For example, hydrogen-oxygen fuel cells typically utilize the transformation of gaseous oxygen and hydrogen into liquid water at solid-phase, electrically-connected catalysts, like platinum metal.

Many gas-to-liquid or liquid-to-gas processes are most effectively carried out by so-called Gas Diffusion Electrodes (GDEs). At the present time, commercially available GDEs typically comprise fused, porous layers of conductive particles (usually carbon particles) of different size. The outer-most layers typically contain particles of the smallest dimensions, fused together with lesser amounts of hydrophobic PTFE (polytetrafluoroethylene, or Teflon™) binder. The inner-most layers typically contain the largest particles. There may be multiple intermediate layers of intermediary particle size.

The intention of this gradation in particle size within GDEs, from largest in the center to smallest on the outer sides, is to create and control a three-phase solid-liquid-gas boundary within the electrode. This boundary should have the largest possible surface area. The creation of such a boundary is achieved, effectively, by controlling the average pore sizes between the particles, ensuring that the smallest pore sizes are at the edges and the largest are in the center. Since the pores are typically relatively hydrophobic (due to the PTFE binder), the small pore sizes at the edges (e.g. 30 microns pore size) act to hinder and limit the ingress of liquid water into the GDE. That is, water can penetrate only a relatively short distance into the GDE, where the electrochemically active surface area per unit volume, is largest. By contrast, the larger pores in the centre of the GDE (e.g. 150 microns pore size), allow for ready gas transmission at low pressure along the length of the GDE, with the gas then forming a three-way solid-liquid-gas boundary with the liquid water at the edges of the GDE, where the electrochemically active surface area per unit volume is the largest.

Layered porous electrode structures are presently the industry standard for:

(1) conventional free-standing GDEs (for example, of the type used in hydrogen-oxygen PEM fuel cells); and
(2) hybrid GDEs, where a GDE layer has been incorporated within an electrode, typically between a current collector and the gas zone.

GDEs of this type often display significant technical problems during operation. These largely derive from the difficulty of creating a seamlessly homogeneous particulate bed, with uniform pore sizes and distributions, and uniform hydrophobicity (imparted by the hydrophobic PTFE binder within the GDE). Because of the resulting relative lack of uniformity in the GDE structure, the three-phase solid-liquid-gas boundary created within the GDE may be:

Unstable and fluctuating. The location of the boundary within the GDE may be subject to changing conditions during reaction which cause the boundary to constantly re-distribute itself to new locations within the GDE during operation.

Inhomogeneous. The boundary may be located at widely and unpredictably divergent depths within the GDE as one traverses the length of the GDE.

Inconsistent and ill-defined. At certain points within the GDE, there may be multiple and not a single solid-liquid-gas boundary.

Prone to failure. The boundary may fail at certain points within the GDE during operation, causing a halt to the desired chemical reaction. For example, a common failure mode is that the GDE becomes completely filled with the liquid phase, thereby destroying the three-phase boundary; this is known in the industry as "flooding". Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. In all cases, flooding induces a decline in the voltage output and power generation of such fuel cells.

Problems of this type are not conducive to optimum operations and may result in uneven, low-yielding, incomplete or incorrect reactions, amongst others.

Conventional 3D Particulate Fixed-Bed Electrodes and GDEs

At the present time, 3D particulate fixed bed electrodes and gas diffusion electrodes (GDEs) are conventionally fabricated by mixing carbon black and PTFE powders and then compressing the solid mixture into a bulk, porous electrode.

The pore size of the resulting structure may be very roughly controlled by managing the particle size of the particulates used. However, it is difficult to achieve a uniform pore size throughout the electrode using this approach because particles, especially "sticky" particles like PTFE, often do not flow evenly and distribute themselves uniformly when compressed. A wide range of pore sizes are therefore typically obtained. It is, moreover, generally not possible to create structures with uniformly small pore sizes, such as 0.05 µm-0.5 µm in size.

The hydrophobicity of the structure is typically controlled by managing the relative quantity of PTFE incorporated into the structure. The PTFE holds the structure together and creates the required porosity. However, its quantity must be carefully controlled so as to impart the electrode with an appropriately intermediate hydrophobicity. An intermediate hydrophobicity is needed to ensure partial, but not complete water ingress. In the case of GDEs, this is needed to thereby create a solid-liquid-gas boundary within the carbon black matrix that makes up the electrode.

This method of constructing 3D particulate fixed bed electrodes and gas diffusion electrodes creates some significant practical problems when operating such electrodes in industrial electrochemical cells, particularly in electro-synthetic and electro-energy (e.g. fuel cell) applications. These problems include the formation of three-way solid-liquid-gas boundaries that are: ill-defined, inconsistent, unstable, fluctuating, inhomogeneous, and prone to failures like flooding.

Problems of this type largely arise from the intrinsic lack of control in the fabrication process, which attempts to create all of the inherent properties of the electrode— including porosity, hydrophobicity, and conductivity—in a single step. Moreover, the fabrication method seeks to simultaneously optimise all of these properties within a single structure. This is often not practically possible since the properties are inter-related, meaning that optimising one may degrade another.

Despite these drawbacks, the approach of combining particulate carbon black and PTFE into a compressed or sintered fixed bed remains the standard method of fabricating GDEs for industrial electrochemistry. This approach is used to fabricate, for example, free-standing GDEs of the type used in hydrogen-oxygen PEM fuel cells. Even where only a GDE component is required within an electrode, the standard method of fabricating that GDE component is to form it as a compressed, porous layer of particulate carbon black and PTFE.

For the above and other reasons, the conventional method of making GDEs and the properties of conventional GDEs, and methods for managing electrochemical reactions occurring therein, are open to improvement.

FIG. 1 (prior art) depicts in a schematic form, a conventional 3D particulate fixed bed electrode or a gas diffusion electrode (GDE) 110, as widely used in industry at present.

In a conventional 3D particulate fixed bed electrode or GDE 110, a conductive element (e.g. carbon particles) is typically combined (using compression/sintering) with a non-conductive, hydrophobic element (e.g. polytetrafluoroethylene (PTFE) Teflon™ particles) and catalyst into a single, fixed-bed structure 110. The fixed-bed structure 110 has intermediate hydrophobicity, good but not the best available conductivity, and a pore structure that is non-uniform and poorly defined over a single region 113. When the 3D particulate fixed bed electrode or GDE 110 is then contacted on one side by a liquid electrolyte and on the other side by a gaseous substance, these physical features bring about the formation of an irregularly-distributed three-phase solid-liquid-gas boundary within the body of the electrode 110, below its outer surface 112 and within single region 113, as illustrated in the magnified view presented in FIG. 1. At the three-phase boundary, electrically connected catalyst (solid phase) is in simultaneous contact with the reactants (in either the liquid or the gas phase) and the products (in the other one of the liquid or gas phase). The solid-liquid-gas boundary within the GDE 110 therefore provides a boundary at which electrochemical liquid-to-gas or gas-to-liquid reactions may be facilitated by, for example, the application of a particular electrical voltage. The macroscopic width of the three-phase solid-liquid-gas boundary is comparable or similar in dimension to the width of the conventional GDE. The thickness of the three-phase solid-liquid-gas boundary in a conventional GDE is typically in the range of from 0.4 mm to 0.8 mm in fuel cell GDEs up to, higher thicknesses, such as several millimeters, in industrial electrochemical GDEs.

Overpressure and Flooding

The phenomenon of flooding described above is often caused by ingress of liquid electrolyte, for example water, into the gas diffusion electrode when the liquid electrolyte is subject to any sort of external pressure. For example, in an industrial electrolytic cell of 1 meter height, water at the bottom of the cell is pressurised at 0.1 bar due to the hydraulic head of water. If a GDE were used at this depth, the GDE would typically be immediately flooded by water ingress because modern-day GDEs have very low "wetting pressures" (also known as the "water entry pressure"), that are typically less than 0.1 bar (although GDEs with wetting pressures of 0.2 bar have recently been reported in WO2013037902). GDEs are, additionally, relatively expensive.

This is a particular problem in industrial electrochemical cells in which it is highly beneficial to apply a gas, for example such as oxygen or hydrogen, to an electrode, via the use of a GDE at that electrode. Many industrial electrochemical cells are large, employing water electrolyte with a depth greater than 1 meter in the cell. If a GDE with wetting pressure less than 0.1 bar is used, then the cell will leak from its electrolyte chamber unless additional means are applied to balance the pressure differential between the liquid and the gas side of the GDE.

Companies have therefore gone to great lengths to try to operate GDEs at or near 0.1 bar. For example, WO 2003035939 describes a method for segmenting the water head so that a depth of more than 1 meter can be used but no part of the GDE feels more than 0.1 bar trans-electrode pressure.

In other industrial electrochemical cells, electrolyte is routinely pumped around the cell. Unless expensive pressure-compensation equipment is installed to scrupulously avoid pressure differentials, such pumping actions may readily generate local increases in the liquid pressure of 0.1 bar or more, thereby causing the cell to leak from its electrolyte chamber if a GDE was used as one of the electrodes.

The counterpart to the problem of flooding relates to the development of excess pressure on the gaseous side of conventional GDEs. If the gas pressure in a conventional GDE becomes even a little higher than the liquid pressure, then excess gas may pass through the GDE, exiting as bubbles at the liquid-facing side of the GDE. The formation of bubbles in this way is generally deleterious to the performance of the cell in that bubbles typically: (i) "mask" the electrode surface, causing a decline in the rate of reaction, and (ii) increase the ionic resistance of the electrolyte solution, inducing unnecessary energy consumption.

These problems related to pressure equalisation at the gas-liquid interface in GDEs are compounded by the fact that many industrial electrochemical cells operate most effectively when the liquid electrolyte is pressurised to, for example, several bars of pressure. As it can be extremely difficult to maintain pressure equalisation at a GDE, solid-state electrodes, such as dimensionally-stable electrodes, must instead be used. Such electrodes typically generate bubbles of the product gases, so that, the gas-liquid interface for such electrodes involves the surface of the gas bubbles present in the liquid electrolyte at the electrode face. The gas within such bubbles must necessarily and automatically be at the same pressure as the surrounding liquid electrolyte, in order for the bubble to resist collapse, or to avoid uncontrolled expansion. Under these circumstances, pressure equalisation is not a challenge and the problem is thereby avoided.

The technical problems associated with commercially available GDEs, along with their high cost and other factors, mean that it is generally commercially and technically unviable to use GDEs in many present-day industrial electrochemical gas-to-liquid or liquid-to-gas processes.

This is demonstrated by the very extensive efforts that have been made over the years seeking to develop GDEs and pressure-equalising apparatuses to deal with these challenges in the case of the chlor-alkali process. The chlor-alkali process is one of the most widely used electrochemical processes in the world. Numerous patent applications have described approaches seeking to overcome the problem of pressure equalisation in the chlor-alkali process. For example, Patent Publication Nos. WO 2003035939, WO 2003042430, and, more recently, WO 2013037902, have described pressure-equalising apparatuses and/or fabrication techniques to create Gas Diffusion Electrodes able to avoid leaking up to 0.2 bar liquid overpressure.

In summary, in order to realise the benefits that GDEs may confer upon electrochemical gas-to-liquid and liquid-to-gas processes, new electrochemical cells, GDEs and/or methods to manage electrochemical reactions or pressure differentials at the liquid-gas interface of GDEs are needed. Preferably, an improved Gas Diffusion Electrode should be relatively inexpensive, robust and/or mechanically strong, and have a relatively high wetting pressure.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

This Summary is provided to introduce a selection of concepts in a simplified form that are further described below in the Examples. This Summary is not intended to identify all of the key features or essential features of the claimed subject matter, nor is it intended to be used to limit the scope of the claimed subject matter.

As used herein, we define two new quantities for Gas Diffusion Electrodes:
(a) "Wetting pressure" (or "water-inlet pressure"). "Wetting pressure" is defined as the lowest excess of pressure on the liquid electrolyte side of a GDE relative to the gas side of the GDE, at which the liquid electrolyte penetrates and floods the GDE. Wetting pressure (relative to water) is a well-known and readily measured physical quantity that is widely used in the field of porous membranes in the water treatment industry. However, the concept has never been applied to GDEs.
(b) "Bubble point". The "bubble point" is defined as the lowest excess of pressure on the gas side of a GDE relative to the liquid electrolyte side of the GDE, at which the gas blows through the GDE and forms bubbles at the electrode surface on the liquid electrolyte side in the electrochemical cell. "Bubble point" is a well-known and readily measured physical quantity (relative to water) that is widely used in the field of hydrophobic membranes in the water treatment industry. However, the concept has never been applied to GDEs.

Following from the inventors' realisations, at least some problems referred to in the preceding background section can now be redefined by reference to these terms. In effect, conventional GDEs have: (i) low "wetting pressures" (typically less than 0.1 bar), which causes them to flood (and leak) easily, and (ii) low "bubble points", which result in ready bubble-formation at the liquid side of the conventional GDE.

In one example aspect, there is provided a method for managing electrochemical reactions. In another example aspect, there is provided an electrochemical cell for electrochemical reactions. The term "managing" is defined in this specification as: to proactively direct, arrange, contrive to arrange, accomplish, or exert control over an electrochemical process in such a way as to bring about an industrially beneficial outcome. In another example aspect, there are provided Gas Diffusion Electrodes with improved, increased or high wetting pressures and/or improved, increased or high bubble points. That is, example GDEs with a proclivity for flooding-free and/or bubble-free operation are disclosed.

The inventors have found that example GDEs of this type or class can provide inexpensive, robust, and/or mechanically strong electrodes that can have an unusually high electrochemical activity, and can, consequently, be readily, generally, and/or beneficially deployed as gas diffusion electrodes in a variety of industrial electrochemical processes, methods, cells and/or devices.

In one example form, there is provided a method for managing an electrochemical reaction in an electrochemical cell, the electrochemical cell having a gas diffusion electrode positioned between a liquid electrolyte and a gas region, the method comprising: applying a pressure differential between the liquid electrolyte and the gas region that is less than the wetting pressure of the gas diffusion electrode; or applying a pressure differential between the gas region and the liquid electrolyte that is less than the bubble point of the gas diffusion electrode; wherein these pressure differentials relate to the liquid electrolyte that is produced or consumed and a gas that is produced or consumed during operation of the cell; and wherein the wetting pressure or the bubble point is greater than 0.2 bar.

In another example form, there is provided an electrochemical cell comprising: a gas diffusion electrode having a wetting pressure or a bubble point greater than 0.2 bar relative to a liquid electrolyte and a gas produced or consumed in operation of the cell; and the gas diffusion electrode positioned between the liquid electrolyte and a gas region; wherein in use a pressure differential is applied between the liquid electrolyte and the gas region that is less than the wetting pressure; or a pressure differential is applied between the gas region and the liquid electrolyte that is less than the bubble point.

In one example form, example 3D electrodes or GDEs of the current embodiments are distinguished from conventional particulate fixed-bed GDEs in that they separate the key features of a 3D electrode or GDE into two, or at least two, distinct regions, each of whose properties improve upon and may be more fully controlled than is possible within the single body of a conventional GDE. An example embodiment of such a 3D electrode or GDE may comprise a liquid-and-gas-porous conductive material, which can optionally also include a catalyst which is enhanced or optimized for its catalytic capabilities and conductivity. The conductive material is attached to, coupled to, touching, positioned adjacent to, or abuts, a gas permeable material that is non-conductive and liquid electrolyte impermeable during normal operational use of the electrode, e.g. which may be hydrophobic, for which the pore structure is selected, enhanced or optimised for gas transport properties. Normal operational use is, for example, when the electrode is functioning as intended and not flooded. In an example, a surface of the gas permeable material is facing the porous conductive material. The surface of the gas permeable material may, but need not necessarily, touch or contact the porous conductive material, for example there may be an intermediary binder material or layer that can include one or more catalysts. At or near the surface of the gas permeable material is an interface or boundary region of the gas permeable material and the porous conductive material. When the electrode is in use, a three-phase solid-liquid-gas boundary is able to form at or near the surface of the gas permeable material facing the porous conductive material. In this context, "at or near" the surface is intended to mean within a distance being the thickness of a binder material (if present, and as discussed herein), or within a distance being the macroscopic width of the three-phase solid-liquid-gas boundary itself, or within a distance of any overlap of the gas permeable material and the porous conductive material, or within a distance being the width of the porous conductive material. The three-phase solid-liquid-gas boundary need not form precisely 'at' the surface, but can form 'near' the surface in the sense of being close, neighboring, adjoining, immediately next to or within, or proximate. The three-phase solid-liquid-gas boundary can further move in response to the application of an excess gas or liquid pressure, however the boundary will remain 'near' to the surface as described during normal operational use.

Preferably, the two regions (being a first region including the porous conductive material and a second region including the non-conductive gas permeable material) are substantially distinct, demarcated or separated, although they are positioned adjacent, abut, touch or adjoin each other, so that there is an interface or a boundary region, or possibly an overlap.

In such an example embodiment, the non-conductive, liquid electrolyte impermeable or hydrophobic, gas permeable material has pores that are better defined, more uniform, and of smaller average size, than can be achieved in a conventional GDE. The liquid-and-gas-porous conductor, preferably provided with a catalyst, may be more conductive than a conventional GDE, while its low hydrophobicity may see the porous conductor completely or substantially completely filled with liquid electrolyte under normal operating conditions, thereby enhancing or maximally facilitating catalysis. In contrast, in a preferred form, the high hydrophobicity of the non-conductive, hydrophobic, gas permeable material will typically see the gas permeable material completely empty or substantially empty of liquid electrolyte at atmospheric pressure, thereby enhancing or maximally facilitating gas transport into and out of the GDE.

When such an example embodiment 3D electrode or GDE is contacted on the conductive side by a liquid electrolyte and on the non-conductive side by a gaseous material, then the above physical features cause the formation of a three-phase solid-liquid-gas boundary at or near a surface of the gas permeable material facing the porous conductive material, which also can be at the interface between the two distinct regions. This boundary is quite different to the three-phase solid-liquid-gas boundary in a conventional GDE. It differs in that it is better defined, narrower, more stable and/or more robust than can be achieved in a conventional GDE. Thus, in operation of a preferred embodiment, a three-phase solid-liquid-gas boundary forms at or near a surface of the gas permeable material facing the porous conductive material (which may also be at the interface, or a boundary region, of the porous conductive material, which can include a catalyst, and the non-conductive gas permeable material). This provides a three-phase solid-liquid-gas boundary with a relatively narrow macroscopic width, for example in comparison to the width or thickness of the electrode.

These features are important because the inventors have found that example embodiment 3D electrodes or GDEs can provide, at or near the interface of the two regions, an enhanced or optimum pore structure, for example hydrophobic pore structure, that facilitates improved or maximum gas transport, with an enhanced or optimally conductive, improved or maximally catalytic structure. In effect, at the three-phase solid-liquid-gas boundary in example embodiment 3D electrodes or GDEs, each of the critical properties of a gas diffusion electrode may be made ideal, or, at least, nearer to ideal than is otherwise possible.

The inventors have further found that the effect of this enhancement or optimisation yields surprising and remarkable electrochemical performance. Despite the three-phase solid-liquid-gas boundary being narrower and confined to what appears to be a two dimensional (2D), or substantially 2D, macroscopic geometry, the electrochemical capabilities of the three-phase solid-liquid-gas boundary in example embodiment 3D electrodes or GDEs substantially improves upon and, in fact, far exceed those of conventional GDEs.

These enhancements provide unexpected improvements over conventional GDEs. They appear to arise because the fabrication of conventional particulate fixed-bed GDEs as currently employed in the art, is predicated on creating all of the important physical properties at the same time within a single material. Such an approach effectively ignores the fact that the key properties of GDEs (namely: pore structure, hydrophobicity, gas transport, liquid transport, conductivity and catalytic activity) are typically inter-dependent and are therefore not open to ready, concurrent enhancement or optimisation within a single material. Example embodiment GDEs as described herein take account of this limitation and separately optimise one or more of the key properties, to thereby achieve more ideal overall properties at the interface of the two distinct regions.

As used herein, a three-dimensional (3D) electrode is a solid, gas permeable or liquid flow-through electrode whose effective surface area is greater than the geometric 2D surface area of the electrode. 3D electrodes are non-planar electrodes that typically improve the transport of one or more reactant species to the 3D electrode's surface (by utilising the increased effective surface area). Reference to 3D electrodes should be read as also including flow-through electrodes or porous electrodes.

Reference to a gas permeable material should be read as a general reference including any form or type of gas permeable medium, article, layer, membrane, barrier, matrix, element or structure, or combination thereof.

Reference to a gas permeable material should also be read as including any medium, article, layer, membrane, barrier, matrix, element or structure that is penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material may be porous, may be a composite of at least one non-porous material and one porous material, or may be completely non-porous. The gas permeable material can also be referred to as a "breathable" material. By way of clarifying example only, without imposing any limitation, an example of a gas permeable material is a porous matrix, and an example of a substance from which the gas permeable material is made or formed is PTFE.

Reference to a porous conductive material should be read as including any medium, article, layer, membrane, barrier, matrix, element or structure that is penetrable to allow movement, transfer, penetration or transport of one or more gases and/or liquids through or across at least part of the material, medium, article, layer, membrane, barrier, matrix, element or structure (i.e. the porous conductive material). That is, a substance of which the porous conductive material is made may or may not be gas and/or liquid permeable itself, but the material, medium, article, layer, membrane, barrier, matrix, element or structure formed or made of, or at least partially formed or made of, the substance is gas and/or liquid permeable. The porous conductive material may be a composite material, for example composed of more than one type of conductive material, metallic material, or of a conductive or metallic material(s) and non-metallic material(s). By way of clarifying examples only, without imposing any limitation, examples of porous conductive materials include porous or permeable metals, conductors, meshes, grids, lattices, cloths, woven or non-woven structures, webs or perforated sheets. The porous conductive material may also be a material that has "metal-like" properties of conduction. For example, a porous carbon cloth may be considered a porous conductive material since its conductive properties are similar to those of a metal.

The porous conductive material may be a composite material, for example composed of more than one type of conductive material, metallic material, or of a conductive or metallic material(s) and non-metallic material(s). Furthermore, the porous conductive material may be one or more metallic materials coated onto at least part of the gas permeable material, for example sputter coated, or coated or deposited onto at least part of a separate gas permeable material that is used in association with the gas permeable material. By way of clarifying examples only, without imposing any limitation, examples of porous conductive materials include porous or permeable metals, conductors, meshes, grids, lattices, cloths, woven or non-woven structures, webs or perforated sheets. The porous conductive material may be a separate material/layer attached to the gas permeable material, or may be formed on and/or as part of the gas permeable material (e.g. by coating or deposition). The porous conductive material may also be a material that has "metal-like" properties of conduction. For example, a porous carbon cloth may be considered a 'porous conductive material' since its conductive properties are similar to those of a metal.

A desirable feature of example GDEs of the current embodiments is their ability to contain electrolytes, for example water, acid, or caustic, within electrochemical cells and devices even at relatively high applied pressures on the liquid electrolyte, whilst simultaneously bringing gases, for example oxygen or hydrogen, to the electrode interface without any need for bubble formation or substantial bubble formation. Moreover, example GDEs of the current embodiments may be significantly less expensive than conventional GDEs.

In a further example aspect, there is provided a gas permeable 3D electrode comprising: a gas permeable material; and a porous conductive material attached to or positioned adjacent to the gas permeable material. In a preferred aspect, the gas permeable material is non-conductive and liquid electrolyte impermeable, e.g. hydrophobic, during normal operational use of the electrode. Preferably, a three-phase solid-liquid-gas boundary is able to form at or near a surface of the gas permeable material facing the porous conductive material. In another example aspect, there is provided a gas permeable 3D electrode comprising: a gas permeable material, preferably that is non-conductive and liquid electrolyte impermeable; a porous conductive material attached to or positioned adjacent to the gas permeable material; and a catalyst in electrical communication with the porous conductive material, where the catalyst may be located on the porous conductive material or on the gas permeable material, or the catalyst may be located on both the porous conductive material and the gas permeable material. In other example aspects, the porous conductive material can be attached to, fixed to, positioned adjacent, or positioned near with some degree of separation, the gas permeable material. In another example aspect, the porous conductive material is preferably attached to the gas permeable material by using a binder material, which may also be provided with one or more catalysts. The gas permeable 3D electrode can also be termed a gas permeable composite 3D electrode.

In a preferred example, the gas permeable material is non-conducting and impermeable to a liquid electrolyte, during normal operational use of the electrode, and the porous conductive material is permeable to the liquid electrolyte. Preferably the gas permeable material is a different material to the porous conductive material, which are provided as sheets or layers and laminated together.

Further aspects, details and applications of example 3D electrodes and GDEs that can be utilised can be found in the Applicant's concurrently filed PCT patent applications "Composite Three-Dimensional Electrodes and Methods of Fabrication" filed on 30 Jul. 2014, "Modular Electrochemical Cells" filed on 30 Jul. 2014, and "Electro-Synthetic or Electro-Energy Cell with Gas Diffusion Electrode(s)" filed on 30 Jul. 2014, which are all incorporated herein by reference.

The combination of the above properties means that example GDEs of the present embodiments can provide an inexpensive, robust, and/or mechanically-strong GDE that has a relatively high wetting pressure and unusually high electrochemical activity. GDEs of this class or type can, consequently, be readily, generally, and beneficially deployed as gas electrodes in a variety of industrial electrochemical processes and devices. This additionally provides the ability to manage electrochemical reactions using the example GDEs.

It has further been realised by the inventors that the unique qualities of the developed electrodes or GDEs, along with other physical properties, are indicative of a powerful proclivity by electrodes and GDEs of this class or type, to facilitate gas depolarization reactions at electrodes, for example the counter electrode, in industrial electrochemical, electro-synthetic and/or electro-energy processes, cells and/or devices. These advantageous properties are believed to arise from the unique features of distinctive 3D electrodes and GDEs.

The porous conductive material can be attached to the gas permeable material by being adhered to or laminated to the gas permeable material. Alternatively, the porous conductive material can be provided on the gas permeable material by being coated on or deposited on at least part of the gas permeable material. Alternatively, the gas permeable material can be provided on the porous conductive material by being coated on or deposited on at least part of the porous conductive material.

A key feature of GDEs of this type or class is that they can display substantially high, high or even extraordinarily high wetting pressures. For example, when an ePTFE membrane with about 0.2 μm sized pores are used for the liquid impermeable and gas permeable material of GDEs, then the resulting GDEs typically display wetting pressures that are very similar to the wetting pressures of the membranes themselves; namely, about 3.4 bar. The addition of a barrier layer or film that permits transport of the reactant/product gas but excludes water vapour would typically elevate this wetting pressure still further. The result is very substantially greater wetting pressures than displayed by conventional GDEs, which do not appear to exceed 0.2 bar (see, for example, recent International Application Publication No. WO 2013037902, which describes the fabrication of a novel GDE with a "record" wetting pressure of 0.2 bar).

In example aspects, industrial or commercial gas-to-liquid and/or liquid-to-gas electrochemical processes can be improved, enhanced or more optimally managed by:
1. using GDEs having wetting pressures and/or bubble points greater than 0.1 bar or greater than 0.2 bar, such as those described above rather than conventional electrodes, at one or more, or each, electrode where a liquid-gas interface exists in the electrochemical cell, and/or
2. applying a suitable pressure differential across or between the liquid-side and the gas-side of the one or more GDEs to thereby obtain an improved efficiency of the reaction, for example under conditions where:
   a. The three-phase solid-liquid-gas interface within the GDE is maintained in a well-defined, narrow, and/or stable state during operation. This can be achieved by ensuring that the pressure applied by the liquid electrolyte on the GDE relative to the gas side of the GDE, does not exceed the wetting pressure of the GDE during operation,
   and/or
   b. An electrode face of the GDE is maintained as bubble-free or substantially free of new bubble formation, during operation. This can be achieved by ensuring that the pressure applied by the gas on the GDE relative to the liquid side of the GDE, does not exceed the bubble point of the GDE during operation.

Thus, it is generally not necessary, nor beneficial to employ complex and expensive pressure-equalising equipment in industrial gas-liquid electrochemical cells employing GDEs. Instead, an improvement or benefit may be achieved by using GDEs with relatively high wetting pressures and/or bubble points, for example in association with relatively simpler pressure monitoring equipment to thereby maintain a suitably effective pressure differential across the one or more GDEs. During operation, preferably at all times, the pressure differential should be maintained as less than the wetting pressure of the ODE (when the liquid electrolyte side has the higher pressure) or its bubble point (when the gas side has the higher pressure).

Accordingly, in various example aspects, there is provided a method and/or an electrochemical cell to manage gas-to-liquid or liquid-to-gas electrochemical processes, the method and/or electrochemical cell comprising or utilising:
1. The use of one or more gas diffusion electrodes, with a relatively high wetting pressure and/or a bubble point, for example greater than about 0.2 bar, where a liquid-gas interface exists in the electrochemical cell;
2. Subjecting the one or more gas diffusion electrodes to a suitable pressure differential between a liquid side and a gas side, whilst ensuring that:
3. an excess pressure on the liquid side of the GDE over the gas side, does not exceed the wetting pressure of the GDE during operation (in cases where the liquid electrolyte side has the higher pressure); and/or
4. an excess pressure on the gas side of the GDE over the liquid side, does not exceed the bubble point of the GDE (in cases where the gas side has the higher pressure).

It should be noted that the electrochemical cell according to various embodiments is not restricted to GDEs of the novel type or class described above. Whilst these GDEs are particularly useful, the method and electrochemical cell of the present embodiments can be applied to all types of GDEs having wetting pressures and/or bubble points greater than about 0.2 bar.

In one embodiment, very substantial improvements may be achieved in gas-to-liquid and/or liquid-to-gas electrochemical processes by equipping the electrochemical cells with suitable GDEs and then operating the electrochemical cells with relatively high pressure on the liquid electrolyte side relative to the gas side of the GDE, or on the gas side relative to the liquid electrolyte side. For example, a high pressure differential of greater than or equal to about 2 bar can be employed. Also for example, a high pressure differential of greater than or equal to about 1 bar, about 2 bar, about 3 bar, about 4 bar, about 5 bar or about 6 bar can be beneficially employed. With suitable GDEs even about 7 bar or greater pressure differentials may be achieved and be beneficial. In all cases however, the pressure differential across the GDE should not exceed: (i) the wetting pressure (when the liquid electrolyte side has the higher pressure), or (ii) the bubble point (when the gas side has the higher pressure).

In another embodiment, other gas-to-liquid and/or liquid-to-gas electrochemical processes may be most suitably operated with relatively moderate pressure on the liquid electrolyte side relative to the gas side of the GDE, or on the gas side relative to the liquid electrolyte side. For example, certain reactions may be most effectively carried out using GDEs operating at a pressure differential of about 0.2 bar or greater. Also for example a moderate pressure differential of greater than or equal to about 0.2 bar, about 0.3 bar, about 0.4 bar or about 0.5 bar can be employed. Once again, preferably in all cases, the pressure differential across the GDE should not at any time exceed: (i) the wetting pressure of the GDE (when the liquid-electrolyte side has the higher pressure) or (ii) the bubble point of the GDE (when the gas side has the higher pressure).

In further embodiments, the pressure differential may be set to be a selected pressure differential that is close to, or very close to, but below the wetting pressure of the GDE (when the liquid electrolyte side has the higher pressure), or the pressure differential may be set to be very close to, but below the bubble point of the GDE (when the gas side has the higher pressure). For example, the pressure differential may be set to about 0.1 bar, about 0.2 bar or about 0.3 bar below the wetting pressure of the GDE (when the liquid electrolyte side has the higher pressure), or the pressure differential may be set to about 0.1 bar, about 0.2 bar or about 0.3 bar below the bubble point of the GDE (when the gas side has the higher pressure).

In alternative embodiments designed to provide a margin of error in the event of sudden and unexpected pressure swings, the pressure differential may be set to be a selected pressure differential that is significantly below the wetting pressure of the GDE (when the liquid electrolyte side has the higher pressure), or the pressure differential may be set to be significantly below the bubble point of the GDE (when the gas side has the higher pressure). For example, the pressure differential may be set to from about 1 bar to about 2 bar, for example about 1 bar or about 1.5 bar, below the wetting pressure of the GDE (when the liquid electrolyte side has the higher pressure), or the pressure differential may be set to from about 1 bar to about 2 bar, for example about 1 bar or about 1.5 bar, below the bubble point of the GDE (when the gas side has the higher pressure).

Preferably, but not exclusively, the pressure differential across the GDE is selected so as to improve or maximise the energy efficiency or other benefits of the reaction and minimise the energy consumption/wastage of the reaction. The selection of the pressure differential employed will be typically dependent upon the nature of the reaction itself and on the physical limitations imposed by the GDEs used.

Improved energy efficiencies may derive from the inherent nature of the reaction under different conditions of pressure, or it may derive from the circumstances of the reaction. For example, application of the method and/or electrochemical cell may have the effect of substantially eliminating bubbles at the liquid face of the GDE and thereby also diminishing the energy-sapping effect created by the bubble overpotential and the increased electrolyte resistance arising from the presence of bubbles. In embodiments where this is achieved, there will be a decrease in the energy requirement for the process. Other benefits, including but not limited to beneficial industrial utility, may also be realized.

In another example, GDEs of the aforesaid type or class are significantly more electrochemically and catalytically active than may reasonably be expected in that they may spontaneously extract oxygen from atmospheric air even though oxygen makes up only 20% of the atmosphere. In so doing, such GDEs may substantially decrease the energy requirements of the reaction. In an alternative example, GDEs of the aforesaid type or class may facilitate an electrochemical reaction that would otherwise not be facilitated or that is not known at the present time. In embodiments where such effects are achieved, there will generally be a decrease in the energy requirement for the process. Other benefits, including but not limited to beneficial industrial utility, may also be realized. For example, it may be enough to use atmospheric oxygen for a reaction rather than needing to provide pure oxygen. Alternatively, a hitherto unknown electrochemical reaction may be facilitated, with beneficial effects.

In still other embodiments, energy savings and other benefits may be achieved by applying a substantial pressure on the liquid electrolyte to thereby produce a pressurised gas product on the gas side of the GDE. In so doing, one may eliminate or diminish the need for an external compressor with which to compress the product gas to a high pressure, thereby decreasing the overall energy requirements of the process. Other benefits, including but not limited to beneficial industrial utility, may also be realized.

It should be noted that, while raising the pressure on the liquid electrolyte side provides potentially significant benefits, it may also have the effect of making it difficult to manage the pressure drop across the GDE. For example, if the product side is unexpectedly drawn down (e.g. a large quantity of gas is taken out), then the pressure on the product side may suddenly drop and the differential pressure will suddenly increase. An example embodiment provides a method and/or electrochemical cell for dealing with such occurrences, especially when GDEs with high wetting pressures and bubble points are used, since they provide more flexibility to operate the cell with the electrolyte at an elevated pressure. In industrial electrochemical processes of this type, it is important to have controls in place to enable the use of differential pressures and to use the controls to manage the differential pressure, along with a good GDE that can handle a relatively high differential pressure.

In a further embodiment, the electrochemical cell/method is applied or used in a reversible fuel cell, to control the differential pressure during electrolysis and, optionally and additionally, to manage the differential pressure during the operation of the fuel cell, so as to obtain high gas transfer into the electrolyte without substantial bubble formation. Further details of this application are described in the Applicant's concurrently filed PCT application "Modular Electrochemical Cells" filed on 30 Jul. 2014, which is incorporated herein by reference.

In further embodiments, high gas pressures relative to the liquid electrolyte pressures may serve to increase the solubility of a reactant gas in the liquid electrolyte and thereby increase the energy or other efficiency of the reaction. Other benefits, including but not limited to beneficial industrial utility, may also be realized.

Energy efficiencies and other benefits of the type described above, may be further improved by: (i) the use of relatively low current densities, which minimise electrical losses and thereby maximise electrical efficiency, (ii) the use of highly-efficient catalysts, including, but not limited to low-cost catalysts comprising of Earth-abundant elements which operate highly efficiently at lower current densities, (iii) optimizing the inter-electrode distance, (iv) using appropriately designed current distributors and collectors, and/or (v) improving mass transfer.

Further ways in which the 3D electrodes or GDEs can be used to improve energy efficiency or industrial utility are described in the Applicant's concurrently filed PCT application "Electro-Synthetic or Electro-Energy Cell with Gas Diffusion Electrode(s)" filed on 30 Jul. 2014, which is incorporated herein by reference.

Embodiments also address the pressing need for electrochemical cells capable of performing gas-to-liquid or liquid-to-gas transformations with high energy efficiencies and low cost, preferably in a modular or relatively small-scale, "on-site" form.

The low cost may be achieved by the combination of: (i) low-cost breathable materials as the substrate for GDE anodes and/or cathodes of the electrochemical cell, (ii) low-cost metallic elements for the conductive portion of the GDE, (iii) compact and inherently efficient cell designs, (iv) inherently inexpensive assembly techniques, (v) the use of low-cost catalysts comprising of Earth-abundant elements, as the catalysts at the anode and cathode, (vi) low-cost reactor arrangements that have large electrode surface areas but small external footprints, (vii) eliminating the need for a diaphragm between the electrodes (as are required in many electrochemical cells), and/or (viii) optimal electrode manufacturing methods. Other means of achieving low-cost and realising other benefits may also be envisaged.

BRIEF DESCRIPTION OF THE DRAWINGS

Illustrative embodiments will now be described solely by way of non-limiting examples and with reference to the accompanying figures. Various example embodiments will be apparent from the following description, given by way of example only, of at least one preferred but non-limiting embodiment, described in connection with the accompanying figures.

EXAMPLES

The following modes, features or aspects, given by way of example only, are described in order to provide a more precise understanding of the subject matter of a preferred embodiment or embodiments.

A New Approach to Making 3D Electrodes and Gas Diffusion Electrodes (GDEs)

Figure 2:
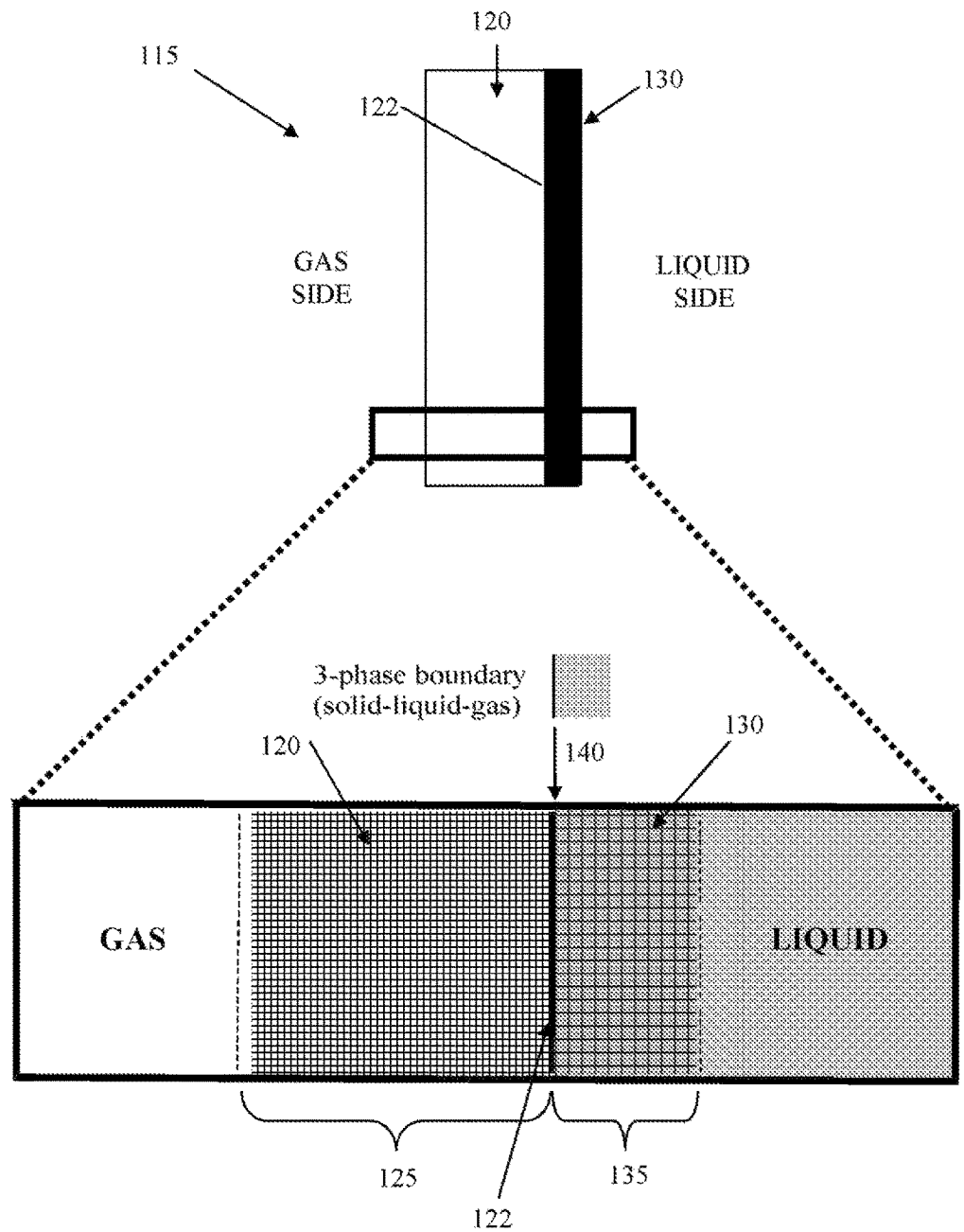
FIG. 2 depicts in schematic form, an example 3D electrode, or gas diffusion electrode, according to the present embodiments (not to scale). The lower part of the figure is a magnified view of a section of the gas diffusion electrode.

FIG. 2 illustrates in schematic form the general structure of an example 3D electrode or GDE 115 that can be used in present embodiments. A 3D electrode or GDE 115 of the present embodiments differs from a conventional 3D particulate fixed bed electrode or GDE 110 in that it separates the features of hydrophobic pore structure and conductivity, preferably catalytic conductivity, into two distinct regions, each of whose properties improve upon and may be more fully controlled than is possible in a conventional 3D particulate fixed bed electrode or GDE. In some embodiments more than two distinct regions may be possible. Thus, an example embodiment of a 3D electrode or GDE 115 may comprise of a liquid-and-gas-porous conductor 130 (i.e. a porous conductive material), that is preferably also provided with a catalyst, coupled with, attached to, abutting, or positioned adjacent a non-conductive gas permeable material 120, that is also preferably liquid electrolyte impermeable, e.g. strongly hydrophobic. The gas permeable material 120 and conductor 130 (i.e. porous conductive material) are substantially distinct, demarcated or separated, thereby providing a first region 135 (conductive region) and a distinct second region 125 (gas permeable region), respectively. The gas permeable material 120 and the conductor 130 are preferably positioned adjacent, abut, touch or adjoin each other, so that there can be touching or overlap of a periphery of the regions at a boundary region or interface 140. The non-conductive, hydrophobic, gas permeable material 120 may display pores that are better defined, more uniform, and potentially of smaller average size, than can be achieved in a conventional 3D electrode or GDE. The liquid-and-gas-porous conductor 130 may, similarly, be more conductive than a conventional 3D electrode or GDE. The low hydrophobicity of the liquid-and-gas-porous conductor (i.e. porous conductive material) 130 will usually also see it completely or substantially completely filled with liquid electrolyte under normal operating conditions, thereby maximally facilitating catalysis. By contrast, the liquid impermeability or high hydrophobicity of the non-conductive, gas permeable material 120 will typically see it completely empty or substantially empty of liquid electrolyte at atmospheric pressure, thereby maximally facilitating gas transport into and out of the GDE 115.

The gas permeable 3D electrode 115 thus provides a gas permeable material 120 that is non-conductive, and a porous conductive material 130 attached to the gas permeable material 120. In operation, the gas permeable material 120 faces a gas side of a cell and the porous conductive material 130 faces a liquid electrolyte side of the cell. In use, a three-phase solid-liquid-gas boundary is able to form at or near a surface 122 of the gas permeable material 120 facing the porous conductive material 130.

The porous conductive material 130 is coupled to, touching, positioned adjacent, attached to or abutting the non-conductive gas permeable material 120, which may be hydrophobic, to form or provide an interface 140 (or boundary region) of or between the porous conductive material 130 and the non-conductive gas permeable material 120. Preferably, this provides two regions (a first region 135 including the porous conductive material 130 and a second region 125 including the non-conductive gas permeable material 120) that are distinct, demarcated or separated. Preferably, the first region 135 and the second region 125 are positioned adjacent, abut, touch or adjoin each other, so that there is an interface 140 (or a boundary region) for the first region 135 and the second region 125. Thus, in operation of a preferred embodiment, a three-phase solid-liquid-gas boundary forms at or near the surface 122 of the gas permeable material 120 facing the porous conductive material 130, which may also be at or near the interface 140 (i.e. at or within a boundary region) between the first region 135 (i.e. the porous conductive material 130, which can include a catalyst) and the second region 125 (i.e. the non-conductive gas permeable material 120). In one example, the solid-liquid-gas boundary, which is formed during use of the electrode in a cell or reactor, has a macroscopic width that is substantially two-dimensional in relation to the width or thickness of the electrode 115. In another example, the solid-liquid-gas boundary is formed at the interface 140 of the gas permeable material 120 and the porous conductive material 130.

When such a 3D electrode or GDE 115 is contacted on the conductive side by a liquid electrolyte and on the non-conductive side by a gaseous material, then the above physical features cause the formation of a three-phase solid-liquid-gas boundary at or near the surface 122 (or interface 140 between the two regions). The three-phase solid-liquid-gas boundary is quite different to that formed in a conventional 3D electrode or GDE. The boundary differs in that it is far better defined, narrower, more stable and/or more robust than can be achieved in a conventional 3D electrode or GDE. For example, the three-phase solid-liquid-gas boundary formed at or near surface 122, or alternatively at or near interface 140, has a macroscopic width that is two-dimensional or substantially two-dimensional in relation to the width of the electrode 115.

These features are important because the inventors have found that example embodiment 3D electrodes or GDEs, such as GDE 115, may, when fabricated in a carefully calibrated way, combine at the interface 140 between gas permeable material 120 and conductor 130, an enhanced or optimum hydrophobic pore structure that facilitates enhanced or maximum gas transport, with an enhanced or optimally conductive, increased or maximally catalytic structure. In effect, at the three-phase solid-liquid-gas boundary in example embodiment 3D electrodes or GDEs, such as GDE 115, each of the critical properties of the electrode may be made ideal, or, at least, nearer to ideal than is otherwise possible.

The effect of this optimisation can be remarkable and unexpectedly significant. Despite being narrower and confined to what appears to be, macroscopically, a 2D geometry, the electrochemical capabilities of the three-phase solid-liquid-gas boundary in example embodiment 3D electrodes or GDEs, such as GDE 115, may substantially improve upon and, in fact, far exceed those of conventional 3D electrode or GDEs, such as GDE 110.

This is because the fabrication of conventional 3D electrodes or GDEs, as currently employed in the art, is predicated on creating all of the important physical properties at the same time within a single material. This approach effectively ignores the fact that the key properties of 3D electrodes or GDEs (namely: pore structure, hydrophobicity, gas transport, liquid transport, conductivity and catalytic activity) are typically inter-dependent and therefore not open to ready, concurrent optimisation within a single material. Example embodiment 3D electrodes or GDEs 115 take account of this limitation and separately optimise the key properties, to thereby achieve more optimum overall properties at the interface 140 between the gas permeable layer 120 and the conductive layer 130.

The inventors have further found that the three-phase solid-liquid-gas boundary may, in fact, at a microscopic level comprise a contorted 3D structure with an unexpectedly large overall surface area. This is particularly the case if the conductive region 135 overlaps somewhat with the gas permeable region 125.

These very fundamental enhancements may impart example embodiment 3D electrodes or GDEs, such as GDE 115, with a range of unexpected and novel electrochemical and physical capabilities. These include:

1. much higher wetting pressures and bubble points than can be achieved in conventional 3D electrodes or GDEs. "Wetting pressure" is defined as the lowest excess of pressure on the liquid electrolyte side of a 3D electrode or GDE relative to the gas side of the electrode, at which the liquid electrolyte penetrates and floods the electrode. The "bubble point" is defined as the lowest excess of pressure on the gas side of a 3D electrode or GDE relative to the liquid electrolyte side of the 3D electrode or GDE, at which the gas blows through the electrode and forms bubbles at the electrode surface on the liquid electrolyte side. Example embodiment 3D electrodes or GDEs, such as GDE 115, typically have wetting pressures and bubble points in excess of 0.2 bar, whereas conventional 3D electrodes or GDEs, such as GDE 110, typically have wetting pressures and bubbles points of 0.2 bar or less;
2. lower electrical resistances, higher electrocatalytic activities and reactivities, as well as more efficient utilization of catalytic materials, than can be realised in conventional 3D electrodes or GDEs, especially, but not exclusively, when operated at relatively low current densities; and
3. an apparent capacity to facilitate hitherto unachievable gas-to-liquid or liquid-to-gas electrochemical reactions, or, at least, improve upon electrochemical reactions that have not proved practically viable to date, especially, but not exclusively, when operated at relatively low current densities. Examples of such transformations include the electrochemical production of hydrogen peroxide from caustic and air oxygen, the production of pure oxygen from air oxygen, the operation of fuel cells with high energy efficiencies, and the direct generation of electrical current by the reaction of methane within a direct methane fuel cell.

Additionally, example embodiment 3D electrodes or GDEs, such as GDE 115, are flexible and may be double-sided, allowing them to be deployed in densely-structured, flexible, spiral-wound and other electrochemical cells, for example of the types described in the Applicant's concurrently filed PCT patent application "Modular Electrochemical Cells" filed on 30 Jul. 2014, which is incorporated herein by reference.

Example embodiment 3D electrodes or GDEs, such as ODE 115, may also be fabricated in an exceedingly low cost manner, allowing for the practical use of: (i) relatively low current densities, which minimise electrical losses and thereby maximise electrical efficiency, and (ii) low-cost catalysts comprising of Earth-abundant elements which only operate efficiently at lower current densities. By these means, it becomes possible to manufacture practically and economically viable, large-scale electrochemical cells for use in industrial-scale electro-synthetic and electro-energy applications. Such cells may achieve energy efficiencies that have hitherto been unavailable in large-scale production and energy environments. For example, chlorine may be manufactured at scale using the chlor-alkali process with 91% energy efficiency, whereas the best available industrial chlor-alkali plants achieve 66% energy efficiency.

The higher wetting pressures that can be achieved in example embodiment 3D electrodes or GDEs, such as GDE 115, relative to conventional GDEs, such as GDE 110, allow for the direct production of pressurised gases in large-scale, industrial liquid-to-gas electro-synthetic/electro-energy cells without the risk of the electrodes becoming flooded and electrolyte leaking out of the electrolyte chamber ('flooding-free' operation). The higher bubble points that can be achieved means that reactant gases may be introduced at pressure into large-scale, industrial gas-to-liquid electro-synthetic/electro-energy cells via gas diffusion electrodes, without forming energy-sapping bubbles in the liquid electrolyte ('bubble-free' operation).

The present embodiments teach the approach of harnessing an interface between a liquid-and-gas-porous conductive layer and a gas permeable, hydrophobic layer to achieve practical and economic advantages such as those described above. Such advantages are achieved when the regions 125 and 135 are carefully designed/selected, fabricated in a calibrated way and located in close proximity to each other. That is, the three-phase solid-liquid-gas boundary should be enhanced or optimised, typically through carefully calibrated fabrication in order to improve upon conventional GDEs.

Fabrication of 3D Electrodes and GDEs

As noted above, a new approach to developing 3D electrodes or GDEs involves separately enhancing or optimising one or more key features of 3D particulate fixed-bed electrodes and gas diffusion electrodes in different locations and then combining the enhanced or optimised components along an interface. Thus, for example, the properties of hydrophobicity and porosity to the liquid electrolyte may be optimised in a non-conductive layer. This layer may then be combined along or about an interface, with a separate porous conductive layer in which the conductance and catalytic properties have been optimised.

The hydrophobic material may be a commercially available expanded PTFE membrane having high hydrophobicity and a substantially uniform pore size. Such membranes are manufactured to more accurate specifications than are possible in conventional 3D particulate fixed bed electrodes or GDEs.

The conductive material may be a metallic material, such as a metal mesh or grid (decorated or coated with a catalyst-binder mixture), that is inherently more conductive than the carbon black used in conventional 3D particulate fixed bed electrodes or GDEs. The porous conductive metal may be selected based on hydrophobicity to match a liquid electrolyte.

Small amounts of PTFE and carbon black may be used in the fabrication of the 3D electrode or GDE; for example in a binder material to bind the catalyst in the conductive layer to the metallic material. A key difference from conventional 3D particulate fixed-bed electrodes and GDEs is, however, that the PTFE and carbon black do not form a superstructure within which a three-way solid-liquid-gas boundary may be formed. Instead, the solid-liquid-gas boundary is formed at or near a surface of the gas permeable material facing the porous conductive material, or in another example this could be said to be at or near the interface between the hydrophobic porous region and the conductive region.

The inventors have studied such interfaces in 3D electrodes and GDEs and discovered that they yield surprisingly and unexpectedly effective electrochemical systems. Their efficacy appears to derive from their unique architecture, which is brought about by careful and calibrated construction. For improved performance, this might be coupled with operation of the 3D electrodes at low current density (at moderate voltages), such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively.

General Example Embodiments

A new approach to developing 3D electrodes that can be used as GDEs involves adapting existing, commonly available porous materials so that they may act as practically useful 3D electrodes and GDEs.

In a preferred example there is provided a 3D electrode which includes a gas permeable material that is liquid impermeable, during normal operational use of the electrode, a porous conductive material at least partially covering the gas permeable material (such as covering one side or part of one side of the gas permeable material) that is liquid permeable and gas permeable, and a binder material which adheres or attaches the gas permeable material and the porous conductive material to each other. The binder material (which may be a mixture of materials) penetrates the gas permeable material to a depth less than the thickness of the gas permeable material. In one example, the binder material can be present between the porous conductive material and the gas permeable material. In another example, the binder material is present at an interface or boundary region of the porous conductive material and the gas permeable material. In another example, the binder material adjoins the porous conductive material with the gas permeable material.

Thus, a porous conductive material (e.g. a conductive metallic layer) is provided at or near one surface of the 3D electrode and a gas permeable material (e.g. a non-conductive layer) is provided at or near the other, opposing, surface of the 3D electrode. The conductivity of the resulting composite 3D electrode thus varies along the thickness of the 3D electrode. The porous conductive material (e.g. conductive metallic layer) is gas permeable and at least partially, preferably fully, liquid permeable, whereas the gas permeable material (e.g. non-conductive layer) is gas permeable and liquid impermeable, during normal operational use of the electrode. The porous conductive material (e.g. conductive metallic layer) can be in one example part of an outer surface of the 3D electrode and is relatively less hydrophobic than the gas permeable material, whereas the bulk 3D electrode is gas breathable and liquid impermeable.

When the 3D electrode is in use, for example as a GDE, a three-phase solid-liquid-gas boundary is formed within the 3D electrode, preferably at or near the surface of the gas permeable material that faces the porous conductive material. The solid-liquid-gas boundary is narrow in macroscopic width compared to the thickness of the electrode or of the gas permeable material. Preferably, the maximum width of the solid-liquid-gas boundary is two-dimensional or substantially two-dimensional in relation to the width (or thickness) of the 3D electrode, or in relation to the width (or thickness) of the gas permeable material. In another example, the maximum width of the solid-liquid-gas boundary is less than or equal to the thickness of the applied binder material in the boundary region or interface between the gas permeable material and the porous conductive material.

The solid-liquid-gas boundary is narrow compared to the width of the electrode. This can depend on the width of the electrode materials used and the application. In one example the solid-liquid-gas boundary can have a maximum (or macroscopic) width of less than 400 µm. In other examples, the solid-liquid-gas boundary can have a maximum (or macroscopic) width of less than about 300 µm; or less than about 200 µm; or less than about 100 µm; or less than about 50 µm; or less than about 10 µm; or less than about 1 µm; or less than about 0.1 µm; or less than about 10 nm. By contrast, conventional gas diffusion electrodes typically have their solid-liquid-gas boundaries distributed over thicknesses of from 0.4 mm to 0.8 mm in the case of fuel cell gas diffusion electrodes, or even greater, such as several millimeters in industrial electrochemical gas diffusional electrodes.

In other examples, the maximum width of the solid-liquid-gas boundary can be defined in relation to the width of the electrode, or in relation to the width of one of the constituting materials or layers. In one example the solidliquid-gas boundary can have a maximum width of less than about 30% of the width of the electrode. In other examples, the solid-liquid-gas boundary can have a maximum width of less than about 20% of the width of the electrode; or less than about 15% of the width of the electrode; or less than about 10% of the width of the electrode; or less than about 5% of the width of the electrode; or less than about 1% of the width of the electrode; or less than about 0.1% of the width of the electrode; or less than about 0.01% of the width of the electrode.

Preferably, though not necessarily, the porous conductive material is a pure or highly purified metal. For example, the porous conductive material can be, but is not limited to pure or purified nickel or Stainless Steel. Alternatively, the porous conductive material can be a metal such as Ti, Cr, Pt, Cu, Pb, Sn, Co, Mn, Au or Ag, or mixtures or alloys thereof. Alternatively, the porous conductive material could be a metal coated with another metal. For example, the porous conductive material could be stainless steel coated with nickel. Alternatively, the porous conductive material could be stainless steel coated with Ti, Cr, Pt, Cu, Pb, Sn, Co, Mn, Au or Ag. In further examples, the porous conductive material may be a polymer coated with a conductive layer or a metallic layer, such as a polymer fabric coated with a metallic layer. In still other examples, the porous conductive material may be formally non-metallic in character but display properties of electrical conduction which are similar to those of metals; for example, carbon fibre or carbon cloth materials.

In some examples, the conductive region or portion (which can include the porous conductive material and a binder material if used) of the 3D electrode comprises less than or equal to about 10% carbon atoms, or less than or equal to about 20% carbon atoms, or less than or equal to about 30% carbon atoms. The carbon atoms can be provided as part of, or attached to, the porous conductive material, and/or included as a component of the binder material, in which case the conductive region or portion is provided by the porous conductive material and the binder material. This can provide a significant benefit, as carbon is less expensive than metals and also lighter. In another example, the conductive region or portion of the 3D electrode can comprise activated carbon. In these examples, the conductive region or portion is not simply a continuous metal or continuous metal coating, such as would be obtained from metallic sputter coating. A benefit of using activated carbon is that some catalysts, such as nano-catalysts, can better associate with or bind to the activated carbon than compared to metals.

In one example, the porous conductive material is stainless steel mesh, for example 100 lines per inch (LPI) stainless steel mesh (thickness about 60-80 micron), which is applied by lamination at, for example, a temperature of 50° C. and a pressure of 500 kPa to a polymer membrane of expanded PTFE (ePTFE) that has been pre-coated by screen-printing, with a layer about 20 micron thick of a binder mixture that comprises carbon black (about 10% by weight), nickel nanoparticles (about 80% by weight), and an ionomer, such as a sulfonated tetrafluoroethylene based fluoropolymer-copolymer (e.g. Nafion™ material), (about 10% by weight).

In other examples, the layer of binder material can be from about 1 micron to about 100 microns thick, or about 10, about 30, about 40, about 50, about 60, about 70, about 80, about 90, or about 100 microns thick. The binder material may comprise:

carbon black (from about 1% to about 30% by weight, or from about 1% to about 20% by weight, or from about 1% to about 10% by weight, or from about 1% to about 5% by weight, or about 5%, or about 10%, or about 15%, or about 20%, or about 25%, or about 30% by weight), nickel particles or nanoparticles (from about 1% to about 90% by weight, or from about 1% to about 80% by weight, or from about 1% to about 70% by weight, or from about 1% to about 60% by weight, or from about 1% to about 50% by weight, or about 10%, or about 20%, or about 30%, or about 40%, or about 50%, or about 60%, or about 70%, or about 80%, or about 90% by weight), and/or an ionomer, such as a sulfonated tetrafluoroethylene based fluoropolymer-copolymer (e.g. Nafion™ material), (from about 1% to about 30% by weight, or from about 1% to about 25% by weight, or from about 1% to about 20% by weight, or from about 1% to about 10% by weight, or from about 1% to about 5% by weight, or about 5%, or about 10%, or about 15%, or about 20%, or about 25%, or about 30% by weight).

In another example, the gas permeable material is a porous polymer membrane or structure. In another example the gas permeable material can be made or formed of one or more substances selected from, but not limited to the group of PTFE, polypropylene, polyethylene or polysulfone. The gas permeable material can be any medium, article, layer, membrane, barrier, matrix, element or structure that is sufficiently porous or penetrable to allow movement, transfer, penetration or transport of one or more gases through or across at least part of the material, medium, article, layer, membrane, barrier, matrix, element or structure (i.e. the gas permeable material). That is, a substance of which the gas permeable material is made may or may not be gas permeable itself, but the material, medium, article, layer, membrane, barrier, matrix, element or structure formed or made of, or at least partially formed or made of, the substance is gas permeable. The gas permeable material can also be referred to as a "breathable" material. By way of example only, a gas permeable material can be a porous membrane and a substance from which the gas permeable material is made or formed can be a polymer, such as PTFE. In one example the 3D electrode is a Gas Diffusion Electrode.

Preferably, the gas permeable material has substantially uniform pore size. Between the porous conductive material (e.g. conductive metallic layer) and the gas permeable material (e.g. non-conductive polymer layer) is a binder material providing a binder layer in a boundary region, and on both sides of the boundary region the pores are substantially uniform in size and distribution. For example, the average pore size can be between about 10 nm to about 500 nm, or preferably between about 50 nm to about 500 nm, or preferably between about 100 nm to about 500 nm, or in more specific examples about 0.1, 0.2, 0.3, 0.4 or 0.5 microns in size. In a most preferred example, the gas permeable material has an average pore size of about 50 nm to about 500 nm and is formed of PTFE.

For example, a commonly available and relatively inexpensive non-conductive porous material is made or formed of "expanded PTFE", also known as ePTFE (where PTFE=polytetrafluoroethylene). ePTFE comprises a highly porous (typically 60-80% porosity) fibrous network of microscopically small, hydrophobic PTFE. An important property of ePTFE is that it is highly porous but also highly hydrophobic. Other widely-available, commodity-type porous polymer membranes, are made or formed from, but are not limited to, polypropylene, polyethylene, polysulfone, and other polymers of similar ilk.

It should be noted that, while the brand name Goretex® polymer material can be used, the inventors have found that use of Goretex® polymer material is not preferred or optimum in the applications described below. In fact, the inventors have found that ePTFE membranes manufactured by the General Electric Company, having some different properties, offer the best and most optimum utility in most electrochemical devices.

In one example, the depth to which the binder material penetrates the gas permeable material (e.g. polymer layer) is in the range of about 1 nm to about 10 µm, or about 50 nm to about 1 µm, or about 50 nm to about 500 nm. In a specific example, the porous conductive material is a nickel mesh of 100 LPI (LPI=lines per inch), the gas permeable material is a 0.2 micron PTFE membrane and the binder material is a combination of carbon black (about 10% by weight), nickel nanoparticles (about 80% by weight), and a sulfonated tetrafluoroethylene based fluoropolymer-copolymer (e.g. Nafion™ material) (about 10% by weight), and the binder material penetrates the gas permeable material to a depth greater than 0 but less than the thickness of the gas permeable material, for example less than about 850 nm.

In another form there is provided a method of fabricating a 3D electrode. The steps include selecting a gas permeable material, for example with a substantially uniform pore size, and then applying, under suitable ('calibrated') heat and pressure for lamination, a porous conductive material to partially coat the gas permeable material, with use of a binder material as an adhesive. The binder material preferably penetrates the gas permeable material to a depth less than the thickness of the gas permeable material.

The ('calibrated') lamination step can include: a particular heat or range of heats of application; a particular pressure or range of pressures of application; a particular time or period of application; and/or a particular circumstance or range of circumstances of application.

Attachment of one or more porous conductive materials, for example as one or more porous conductive layers or meshes, to the gas permeable material, for example a porous polymer membrane, using controllable lamination techniques are employed to produce 3D electrodes. When formed in this way, 3D electrodes with unexpected and improved electrochemical performance may be realised, especially relative to other 3D electrodes and to the cost of manufacture. Further, unrelated materials, for example including catalytic or other materials, can be conveniently added to, or formed upon or in-between the one or more porous conductive materials, layers or meshes, and the gas permeable material to produce 3D electrodes that are practical and useful in electro-energy or electro-synthetic applications. The availability of such 3D electrodes makes viable or improves the practicality of a range of electro-energy and electro-synthetic applications. Such applications are typically unviable or relatively less practical using conventional particulate fixed-bed or gas diffusion electrode technologies.

The porous conductive materials, for example provided as meshes, membranes or layers, can be applied to one or more gas permeable materials, for example provided as meshes, membranes or layers, having a specific, and preferably narrow, range of pore sizes, such as the widely available and relatively low cost polymer membranes used in the water purification industry. Such membranes are manufactured to contain very specific and narrow ranges of pore sizes. By adapting or modifying such membranes or other gas permeable materials to be 3D electrodes, one may conveniently impart upon the 3D electrode highly desirable and otherwise unobtainable pore properties. For example, 3D electrodes may be conveniently and reliably fabricated with tiny (for example less than 500 nm in size) and reasonably or substantially uniform pores that are not easily, reliably, or inexpensively achieved in conventional 3D electrodes. Additionally, the desired pore size can be readily varied by selecting a different gas permeable material, for example provided as a membrane or mesh, for adaption or modification into a 3D electrode. Gas permeable materials with a wide variety of pore sizes are readily available.

A porous conductive material, for example a conductive metallic material, mesh or layer, can be applied such that the produced 3D electrodes, which can be used as GDEs, display unusually high electrochemical activities as a function of the electrochemical surface area present.

General Example Embodiments—Gas Diffusion Electrode (GDE)

When intended to be used in a Gas Diffusion Electrode (GDE) type application, the porous conductive material (e.g. metallic material or layer) is preferably, but not exclusively, applied such that the produced 3D electrodes create uniquely well-defined, narrow and stable three-way solid-liquid-gas boundaries. In a particular example, the porous conductive material may have a thickness in the range of about 1 nm to about 1000 µm, or in the range of about 1 µm to about 100 µm, or in the range of about 5 µm to about 40 µm. By controlling the pore size of the gas permeable material (e.g. a polymer layer), one may also control important physical properties of the 3D electrode, for example a 3D GDE, such as the wetting pressure, the bubble point, and the permeability to gases.

In an example embodiment in the case where a GDE is manufactured using a previously formed polymer membrane as the gas permeable material, the GDE can have substantially the same wetting pressure as that of the polymer membrane (i.e. the gas permeable material) used. In the example case where a membrane having average pore size 0.2 µm is used as the gas permeable material in the GDE, the wetting pressure of both the membrane and the GDE is 3.4 bar (such an example polymer membrane is available from the General Electric Company). Thus, liquid water will only penetrate and flood the GDE upon the application of 3.4 bar of pressure on the liquid side. The addition of a dense, thin film that is, nevertheless porous to gases but not to liquid water, on top of the PTFE may increase the wetting pressure to 10 bar or greater. By contrast, to the knowledge of the inventors all other known GDEs have wetting pressures that currently do not exceed 0.2 bar. Thus, in one form the present example electrode has a wetting pressure above 0.2 bar, and preferably about 3.4 bar or greater.

In preferred examples the porous conductive material is attached to the gas permeable material (e.g. the polymer layer) by being physically (e.g. mechanically) or chemically bonded to the gas permeable material. This can be achieved by the presence of a binder material, or materials, that act to bind the porous conductive material and the gas permeable material together. The binder material may be present everywhere, substantially everywhere or almost everywhere between the porous conductive material and the gas permeable material. Alternatively, the binder material may be present at a selection of spots or regions between the porous conductive material and the gas permeable material. The binder material or materials may further be applied in a pattern to thereby securely attach the porous conductive material to the gas permeable material. The binder material may include, substantially or partially, the material which forms the gas permeable material, for example the polymer material which forms the polymer layer. Alternatively, binder material may be a mixture and comprise one or more unrelated materials which may concurrently impart one or more other desirable properties upon the binder mixture, such as also being a conductor of electricity or a catalyst.

In one example, the binder material attaches to the surface of the porous structure of the gas permeable material (e.g. polymer material or layer). In another example, the binder material penetrates the porous structure of the gas permeable material (e.g. polymer material or layer) to a depth less than the thickness of the gas permeable material (e.g. polymer material or layer).

Example gas permeable or breathable 3D electrodes can be formed by depositing a catalyst within a binder material (e.g. binder layer) on a gas permeable material, followed by attaching or laminating thereto, a porous conductive material. In one example, one could start with a gas permeable non-conductive material and then form thereupon, a binding layer using a binder material containing one or more catalysts. To this combination, a porous conductive material may be laminated using suitable heat and/or pressure.

In a preferred example the 3D electrode is flexible. The porous conductive material or layer can be made at least partially or wholly from a substance and/or in a form that is flexible. The gas permeable material can similarly be made at least partially or wholly from a substance and/or in a form that is flexible. Optionally, the gas permeable material is made at least partially or wholly from a polymer or a combination of polymers, for example PTFE, "expanded PTFE" (ePTFE), polyethylene or polypropylene. The polymer itself may or may not be gas permeable. For example, the polymer itself may not be gas permeable but a structure or membrane formed from the polymer is gas permeable.

Numerous other industrial electrochemical processes may benefit from the use of gas depolarized GDEs, if they were practically viable. These include the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, and others. Electrometallurgical applications, such as metal electrowinning, could also benefit from the energy savings associated with anode depolarization; metal electro-deposition occurs at the cathode side of such cells, while oxygen is evolved at the anode. If oxygen evolution was replaced by hydrogen oxidation on a suitable gas diffusion anode, this would generate substantial energy savings. However, the mechanical characteristics of conventional GDEs make them unsuitable for delimiting narrow-gap chambers, thereby restricting their application in the undivided electrolysis cells that are widely used in electrometallurgical processes. Moreover, conventional GDEs would leak under the hydraulic head of electrolytic solutions commonly used in industrial size electrolysers. Several industrial electrochemical processes in the pulp and paper industry may also benefit from the use of alternative GDEs that could be gas depolarized and withstand a higher pressure differential, including: (a) "black liquor" electrolysis, (b) "Tall Oil recovery" and (c) chloride removal electrolysis. Flooding of GDEs after the build-up of even very mild liquid pressures is, furthermore, a particular and well-recognized problem in fuel cells, such as hydrogen-oxygen fuel cells.

Thus, the electrochemical cell can be used in the electrochemical manufacture of: (a) hydrogen peroxide, (b) fuels from $CO_2$, (c) ozone, (d) caustic (without chlorine), (e) potassium permanganate, (f) chlorate, (g) perchlorate, (h) fluorine, (i) bromine, (j) persulfate, (k) chlorine, (l) caustic (in general), (m) $CO_2$ from methane, and others.

In alternative examples, the electrochemical cell involves electrochemical processes unique to particular industries. Examples include:
(i) electrometallurgical applications, such as metal electrowinning;
(ii) pulp and paper industry applications, such as: (a) "black liquor" electrolysis, (b) "Tall Oil recovery" and (c) chloride removal electrolysis; and
(iii) fuel cell and related device applications, such as hydrogen-oxygen fuel cells, including but not limited to alkaline fuel cells.

In another example aspect, the beneficial effect/s may be achieved by the fact that GDEs according to example embodiments make it possible and practical to carry out entirely new chemical processes, either in cells or devices. For example, hitherto unconsidered processes for the formation of fuels from carbon dioxide, or remediation of $SO_x$ and $NO_x$ pollution, are possible and practical using GDEs according to example embodiments.

In another example embodiment, one or more GDEs are used to inject or introduce a depolarizing gas not only into the depolarizing electrode but also in sufficient quantities to force the gas into the electrolyte to cause the formation of bubbles that will rise within the reactor, causing mixing within the electrolyte, and thereby increasing mass transfer and decreasing concentration polarization effects. Alternatively, one or more GDEs are used to inject an inert gas or some combination of inert gas and depolarizing gas. In this embodiment, the GDE acts like a fine bubble diffuser, and may carry out two functions: to add a gas to the cell and also to provide mixing. Thus, the depolarizing gas and/or an inert gas can be forced into the liquid electrolyte, via the at least one electrode, to cause bubble formation and/or mixing in the liquid electrolyte.

In various further examples: a porous conductive material or layer is provided attached to, positioned adjacent to, positioned or layered upon, or at least partially within the gas permeable material; the porous conductive material or layer is associated with the gas permeable material; the porous conductive material or layer is located on and/or within the gas permeable material; and/or, the gas permeable material is located on and/or within the porous conductive material or layer. In other examples, the gas permeable material is a gas permeable membrane or structure, a gas permeable polymer membrane or structure, a gas permeable porous polymer membrane or structure, or a gas permeable porous membrane or structure.

General Example Embodiments—3D Electrode and Gas Diffusion Electrode (GDE) with a Barrier Layer to Exclude Vapour from the Liquid Electrolyte An example embodiment 3D electrode or GDE may incorporate one or more barrier layers or barrier films that are highly or substantially permeable to the relevant gas stream, but relatively less permeable or impermeable to the transport of the reaction solvent in gaseous form. Several examples of such barrier layers or films exist. Examples of such barrier layers or films that are highly permeable to oxygen gas but poorly permeable or impermeable to water vapour include: polyolefins, poly(methylpentene), organosilicon polymer films, fluorocarbon or perfluorocarbon polymers, especially hyperbranched perfluorocarbon polymers, or mixtures thereof. The incorporation of such a barrier layer in the 3D electrode, for example a 3D GDE, preserves the gas stream outside of the 3D electrode from contamination by the gaseous form of the solvent used (e.g. water vapour) and also protects the gas channels outside of the 3D electrode from being blocked, impeded, or flooded by water condensate. The unique properties of the 3D electrode in respect of avoiding flooding, may thereby be transmitted to the entire network of gas channels and plumbing within a cell in which it is employed.

Additionally, because it can be practically difficult to completely prevent the formation of larger pores in a 3D electrode or to prevent defects from forming over the course of extended use, the barrier layer or barrier film may serve as a means to mask large pores and/or defects in the porous structure that could compromise the ability of the 3D electrode to perform a desired function, for example such as to prevent flooding.

The barrier layer or barrier film may be located on the gas side of the 3D electrode. Alternatively, the barrier layer or barrier film may be located on the liquid side of the 3D electrode, between the porous conductive material (e.g. conductive metallic material) and the gas permeable material (e.g. non-conductive polymer layer).

Preferably, the barrier layer or barrier film is highly or substantially permeable to the gases that are generated (as reaction products) or added (as reactants) from the gas side of the 3D electrode, but poorly permeable or impermeable to the solid, liquid, or gaseous components of the solvent used on the liquid side of the 3D electrode, namely, the electrolyte. For example, in 3D electrodes which form an interface between liquid water and oxygen gas, the barrier layer or barrier film is highly or substantially permeable to oxygen gas, but poorly permeable or impermeable to gaseous water vapour. In a second example in which a 3D electrode forms an interface between methane/natural gas and a liquid solvent, the barrier layer or barrier film is highly or substantially permeable to methane/natural gas, but impermeable or poorly permeable to the gaseous form of the liquid solvent.

In a particular example, the 3D electrode is a composite electrode and comprises a gas permeable material provided as a non-woven layer (e.g. high-density polyethylene fibers, such as for example Tyvek™ polymer material) attached to a barrier layer comprising a polymeric dense thin film (e.g. a polymethylpentene barrier layer) on one side, and a metal mesh on the other side, where the metal mesh is adhered to the polymer layer by a binder material.

Some General Methods of Fabricating an Example 3D Electrode or GDE

In one example, one could start with a gas permeable material provided as a non-conductive material and then apply the porous conductive material by depositing a conductive metallic material on the gas permeable material. In a further example, one or more catalysts can then be deposited as part of a binding layer, with subsequent lamination of the electrode assembly into a single structure using suitable heat and/or pressure. In a still further example, one may coat a binder material to provide a binding layer containing one or more catalysts onto a gas permeable material (e.g. a polymer layer) and then laminate the gas permeable material with a metallic material or layer pre-coated with the same binder material. Several other methods exist to fabricate an example embodiment.

Some General Advantages of Example 3D Electrodes and GDEs

As noted earlier, the presence of well-defined and narrow gas-solid-liquid interfaces in 3D electrodes and GDEs of the present embodiments may eliminate many of the problems that are created in other classes of solid-liquid-gas electrodes, such as conventional gas diffusion electrodes, or trickle-bed electrodes. Examples of the problems that may be eliminated or diminished include, without limitation, instability in, inhomogeneity in, fluctuations in, and/or failure of the solid-liquid-gas boundary. Problems of this type may result in uneven, low yielding, incomplete or incorrect reactions, amongst others.

Additionally, the 3D electrodes/GDEs can provide unexpectedly amplified electrochemical properties of the type describe earlier, including unusually high electrode activities per unit volume of deposited catalyst (included in the binder layer).

The inventors have found that unexpected and disproportionate advantages of this type may be realised when the electrode interface is fabricated in a careful, calibrated manner. For improved performance the electrode might be operated at relatively low current densities, such as from 1 mA/cm$^2$ to 500 mA/cm$^2$ or, preferably, from 1 mA/cm$^2$ to 200 mA/cm$^2$, or preferably from 1 mA/cm$^2$ to 100 mA/cm$^2$, inclusively.

Thus, for example, hydrogen-oxygen fuel cells utilizing the 3D electrodes typically require smaller quantities of catalysts than is normally the case using other types of electrodes. The produced 3D electrodes also do not necessarily require pure oxygen gas or highly compressed atmospheric air oxygen as a feedstock (as is the case in PEM fuel cells). Nor do the produced 3D electrodes necessarily require humidification of the feedstock gases (as is the case in PEM fuel cells). These advantages arise because the conductive layer in 3D electrodes of the present embodiments are well-defined, narrow, and have a high electrochemical area per unit volume of 3D electrode.

Other advantageous features which may be realised include, amongst others: (i) the catalyst in the interfacial region is maximally active, (ii) the catalyst is not wasted by being deposited in other, non-interfacial regions, where catalyst cannot act, (iii) the reactants have improved or maximum access to the electrode surface and suffer fewer limitations in terms of mass transport, and (iv) in one example application, water molecule products are readily and rapidly transported away from the reactive surface of the electrodes (due to the relatively narrow conductive layer and its high electrochemical surface area).

For illustrative purposes only and without limiting the invention, we now describe a representative common problem that may arise in conventional gas diffusion or particulate fixed bed electrodes and show how it may be eliminated in a 3D electrode of the present embodiments.

"Flooding" is a phenomenon that occurs when a liquid (product or reactant) partially or completely fills a gas diffusion electrode, thereby causing a breakdown in the solid-liquid-gas boundary and blocking electrochemical contact with the gas (reactant or product). Flooding is a particular problem in fuel cells, such as hydrogen-oxygen fuel cells, that require the feedstock gases to be humidified. Flooding may be caused by water ingress into the gas diffusion electrode via systematic, incremental percolation through the non-homogeneous pores of the electrode, or it may be caused by spontaneous condensation of the water vapour in the feedstock gas stream. Regardless of its origin, flooding always induces a decline in the voltage output and power generation of such fuel cells.

Flooding does not, however, occur under normal operating conditions in 3D electrodes of the present embodiments since the three-phase solid-liquid-gas boundary is too well-defined and too narrow. There is a very clear separation of the liquid and gas phases in such electrodes, meaning that incremental percolation through the GDL does not occur. Moreover, the narrowness of the interface ensures that any condensation of any size is readily taken up and drawn back into the liquid phase, thereby effectively eliminating the possibility of flooding.

The above advantages confer utility and low-cost upon 3D electrodes of the present embodiments, as well as high performance relative to the current density employed. These properties make the 3D electrodes practical and useful in a variety of industrial applications, including but not limited to electro-energy and electro-synthesis applications. Many such applications are not practically viable without the use of 3D electrodes of the present embodiments. The 3D electrodes also allow the fabrication of practical and viable devices for these transformations, such as spiral-wound reactors and the like.

In further illustrative example applications, the 3D electrodes may also be used to improve or make viable electrochemical devices for: (i) converting air-based oxygen into pure or purer oxygen; (ii) manufacturing hydrogen peroxide; or (iii) use as fuel cells, both hydrogen-oxygen fuel cells and direct methane fuel cells. These example electrochemical devices share a common feature in that the 3D electrodes all display unusually high electrochemical activity relative to the current density employed. This activity appears to derive at least in part, from an unexpectedly strong capacity to sequester and consume oxygen gas from out of the air; a property that is believed to result from the well-defined and narrow three-way solid-liquid-gas boundary in the 3D electrode. The interface appears to create a remarkably selective reaction by the oxygen in air. The reaction is so strongly favoured that it continues within a sealed gas chamber even after the oxygen in the air has been largely depleted, thereby causing the formation of a partial vacuum in the gas chamber. Such a partial vacuum would normally halt or, at least, dramatically slow the reaction. However, in these cells, the vacuum continues growing until effectively all of the oxygen in the air is consumed. To the best of the inventors' knowledge, such effects have not been previously observed. This was undoubtedly because in these examples, the solid-liquid-gas boundary was carefully created to have a width/thickness of the order of 850 nm. This meant that the electrode could operate highly efficiently at a relatively low current density.

Beyond the above, 3D electrodes of the present embodiments may also display the following advantages:
(1) A dramatically higher wetting pressure than is achievable in any known conventional gas diffusion electrode. Conventional gas diffusion electrodes typically flood upon the application of <0.2 bar of external pressure. By contrast, electrodes of the current embodiments contain uniform pore structures in the gas permeable, water impermeable layers, so that they may require far higher external pressures before leaking. For example, embodiment electrodes may contain relatively small/tiny and uniform pore sizes, such as from about 10 nm to about 500 nm, or in one example about 0.2 microns, which can lead to a reduction in or avoidance of flooding of the electrode up to applied pressures of 3.4 bar. This means that a substantial pressure differential can be applied across the electrode, e.g. having an electrolyte at higher pressure on one side of the electrode compared to a gas region on the other side of the electrode, for example a pressure difference of greater than or equal to about 3.4 bar, well above previously known electrodes. By this means, electrodes of the present embodiments can withstand a relatively higher pressure before leaking.

(2) Flexibility of the electrode; the materials used in the electrode can be optionally made to be flexible or bendable, and for example, able to be rolled or spiral-wound. The gas permeable material can be selected from, for example, different porous polymer materials and/or different pore sizes to achieve desired properties of the electrode. This flexibility distinguishes many previous electrodes that are rigid structures.

(3) The ability to produce electrodes of relatively large size. For example, for commercial applications, electrodes can be readily produced having a width and/or a length of greater than or equal to 0.05 m, 0.1 m, 0.2 m, 0.3 m, 0.4 m, 0.5 m, 1 m, or 2 m. In another example electrodes can be readily produced of about 0.05 m, about 0.1 m, about 0.2 m, about 0.3 m, about 0.4 m, about 0.5 m, about 1 m, about 2 m, or larger in width and/or length. In an application where an electrode is rolled or spiral-wound, the flat electrode before rolling may preferably have a width of about 0.05 m or greater, about 0.1 m or greater, about 0.2 m or greater, about 0.3 m or greater, about 0.4 m or greater, about 0.5 m or greater, about 1 m or greater, about 2 m or greater, and a length of about 0.5 m or greater, about 1 m or greater, about 2 m or greater, about 3 m or greater, about 4 m or greater, about 5 m or greater, about 10 m or greater. The rolled or wound electrode may have a diameter of about 0.05 m or greater, about 0.1 m or greater, about 0.2 m or greater, about 0.3 m or greater, about 0.4 m or greater, about 0.5 m or greater, or even larger. This relatively large size distinguishes many previous electrodes that can only be produced in a small size, for example up to the order of 0.01 m in size. The difference in size scale is not a trivial factor since many small electrodes cannot be simply scaled up in size. For example, in relatively small cells having small sized electrodes, it is not required to have or consider a high electrical conductivity in the cell/electrode, because the distances involved are small, so the associated resistances are relatively small. In contrast, in larger scale cells/electrodes, such as the present example, this issue is much more challenging and higher conductivity is required along very good conduction pathways. Hence, a small scale electrode structure cannot typically and simply be scaled up to a large scale electrode.

Further Aspects of Example Gas Diffusion Electrodes (GDEs)

For the purposes of this illustrative example, we refer to the combination of an expanded PTFE (ePTFE) membrane (General Electric Company: pore size 0.2 micron) (i.e. a gas permeable material) overlaid with a fine nickel mesh (200 lines per inch; manufactured by Precision eForming Inc.) (i.e. a porous conductive material), optionally held together by a binder material, or a binder-catalyst material, including about 5-15% Nafion in alcohol/water (supplied by Ion Power Inc.), and about 20-50% by weight of fillers and/or catalyst material.

Figure 1:
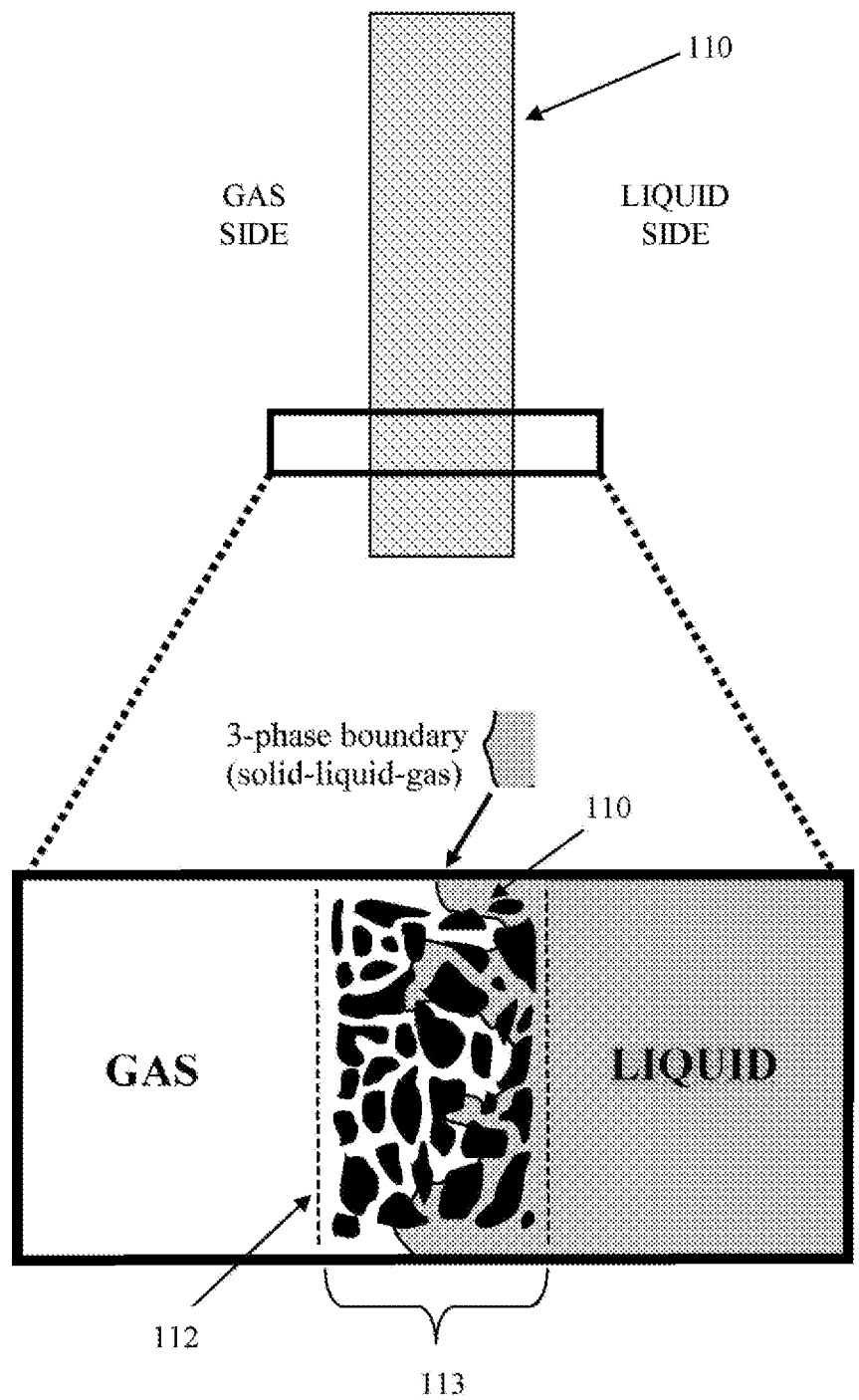
FIG. 1 (prior art) depicts in schematic form, a conventional gas diffusion electrode. The lower part of the figure is a magnified view of a section of the conventional gas diffusion electrode.

FIG. 1 depicts in a schematic form, a conventional gas diffusion electrode (GDE) 110, as widely used in industry at present (Prior Art). In cases where an electrode contains a zone or a layer that is intended to facilitate gas diffusion, FIG. 1 illustrates that gas diffusion layer or zone. FIG. 2 illustrates in schematic form the general structure of an example 3D electrode 115. In a conventional GDE 110, conductive particles (such as carbon particles) are typically mixed with non-conductive, hydrophobic Teflon particles, and then compressed and/or sintered into a single unit whose pore structure is ill-defined and non-uniform. By contrast, in an embodiment of the present GDE 115, the porous conductive material 130 and the gas permeable material 120 are substantially demarcated or separated, although there can be overlap at a boundary region. The pore structure of the gas permeable material 120, for example a non-conductive, hydrophobic material/element, is well-defined and uniform.

Figure 3:
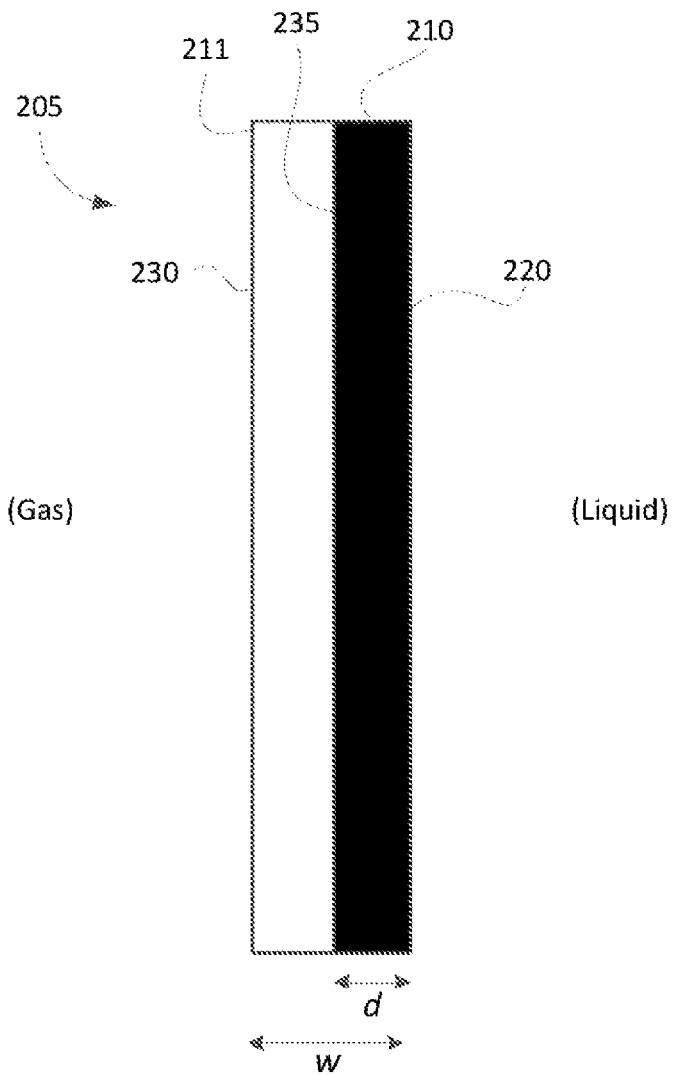
FIG. 3 depicts a schematic cross-sectional view of an example GDE (not to scale).

As can be seen in FIG. 3, the example 3D electrode (or GDE) 205 of width w includes a conductive layer or region 210 of width d with a non-conductive layer or region of width w-d. The dimensions are not accurate and are for illustration only. In the case of one particular example of a laminated electrode, the 3D conductive layer 210 (i.e. porous conductive material) comprises fine nickel mesh, which has a thickness of about 5-8 μm, while the 3D non-conductive layer 211 comprises an ePTFE membrane, which has a thickness of about 20 μm.

While the non-conductive layer or region 211 is thicker than the conductive layer or region 210 in this case, that need not be true in other cases of fabricated 3D electrodes. With other gas permeable materials and other techniques, this relative ratio may be quite different, with conductive layers or regions 210 being thicker and the non-conductive layers or regions 211 being thinner.

For example, in the case of an electrode where a binder material was applied with a paintbrush, the conductive layer comprised the fine nickel mesh and the binder material. The thickness of the binder material providing a binding layer was not easily controlled using a paintbrush, so that thicknesses of a binding layer of up to about 112 μm, for example, may be created. The binder material, moreover, penetrated the outermost portion of the ePTFE layer or membrane (to about 0.1-0.8 μm deep), so that the conductive portion may be cumulatively up to about 120 μm in thickness. The non-conductive portion would typically be about 19.2-19.8 μm thick. Thus, in such a case, the three-phase solid-liquid-gas boundary will fall within a maximum thickness of 0.8+120=120.8 μm. Such large thicknesses generally represent an extreme in the case of GDEs of the present embodiments, although thicknesses of 400-500 μm have also been achieved in the most extreme cases. Generally, but not exclusively, GDEs of the present embodiments formed by lamination of free-standing porous metallic structures to ePTFE membranes will have a three-phase solid-liquid-gas boundary that is less than about 100 μm thick.

In conventional GDEs, the entire GDE is conductive and different pore sizes and intermediate amounts of Teflon binder within the GDE, are used to create the solid-liquid-gas boundary that is formed inside the conventional GDE. However, because the pores in conventional GDEs are created by fusing layers of different particle size, there is relatively poor control on the pore size and distribution. The pores are therefore of a generally wide and non-uniform distribution. Moreover, the pores are generally large, being, at best, typically 30 microns in diameter at the outside edges of the GDE. The solid-liquid-gas boundary that is created within the GDE is therefore poorly controlled and ill-defined, with substantial variations in depth within the GDE. Small changes that occur during use of the GDE may therefore also shift the interface, causing the GDE to be prone to instability or even breakdown. Thus, a common problem in gas-liquid electrochemical transformations is flooding of the GDE. This occurs when the solid-liquid-gas boundary progressively relocates itself into the center of the GDE, until the GDE is effectively filled with liquid.

Whereas a conventional GDE relies upon the presence of larger pores in the center to provide for low-pressure ingress of gases to the interface, example GDEs of the present embodiments rely upon a substantial, large, relatively large or substantially large non-conductive layer or region 211 relative to the volume of the interface 235 with the conductive layer or region 210, to provide for low-pressure ingress of gases.

One advantage involves hitherto unavailable uniformity in how electrochemical gas-liquid reactions take place down the full length of the 3D GDE. Because the solid-liquid-gas boundary is so tightly constrained and uniform, such reactions will essentially occur in an identical way at all points of the interface along the length of the electrode. Practical problems arising from inhomogeneity and instability in the interface, as occur in many conventional GDEs, may therefore be largely eliminated. These include, without limitation, local excesses (or swamping/flooding) of reactants/products, leading to inefficient reaction, energy wastage (e.g. local hotspots), or electrode degradation. Moreover, once created, the interface is relatively stable and easily maintained—more stable and easily maintained that conventional GDEs. These properties result in 3D electrodes that may be more active per unit electrochemical area or per unit volume of catalyst than comparable conventional GDEs.

Another feature is that the solid-liquid-gas boundary is relatively delicate. By this it is meant that the solid-liquid-gas boundary can be degraded (reversibly and temporarily) by non-judicious applications of gas pressure (from the gas-facing side). For example, even relatively small overpressures on the gas side of the GDE can push the liquid out of the conductive layer, diminishing the surface area of the boundary. This will occur at the so-called "bubble point" of the membrane polymer layer. In the extreme case, the liquid may even be pushed away from the electrode, effectively, destroying the solid-liquid-gas boundary or making it so small as to be practically useless. Moreover, in such a situation, gas bubbles may become trapped in the conductive layer or region 210, making it difficult (but not impossible) to regenerate the electrode. To avoid these possibilities, it is generally desirable or necessary to closely control external gas pressures and ensure that the conductive layer or region 210 is properly "wetted" prior to operation. Once operating, GDEs of the present embodiments are generally highly stable. While the solid-liquid-gas boundaries are "delicate" in that they may be destroyed or disrupted upon the application of excesses of pressure, it should be noted that the pressures required to disrupt the three-phase boundaries are much higher than is the case in conventional GDEs. That is, the three-phase solid-liquid-gas boundaries in example GDEs are much less delicate than is the case for conventional GDEs.

Considering another aspect of example electrodes, there are various ways to measure air permeability of a material. For example, porosimietry can be used to determine the flow rate of air through membranes and coated membranes in units of liters per minute (L/min) as a function of applied pressure (in units of psi). Another way to measure air permeability is to use the 'Gurley number' scale, which is obtained with a Gurley densitometer. This measures the time (in seconds) taken to pass a particular fixed volume of air (2.5 $cm^3$) through a sample of fixed area (0.645 $cm^2$) at a fixed applied pressure (0.44 psi). The air permeability of the sample is inversely proportional to the Gurley number. That is, the larger the Gurley number, the less permeable to air is the sample.

Present example 3D electrodes/GDEs, for example using a treated or coated ePTFE membrane, have an air permeability that is very similar to that of the untreated or uncoated ePTFE membrane, at all measured applied pressures. By contrast, the air permeability of a conventional gas diffusion electrode using a Gortex™ membrane as an 'electrolyte leakage barrier' declines very substantially. For example, Gortex™ membranes used in conventional gas diffusion electrodes typically have Gurley numbers of 50-800 seconds. In one example, after they were laminated to a conventional gas diffusion electrode, their Gurley number increased to about 9,000-16,000 seconds. This means that it took 20-180 times longer to transfer the same quantity of air through such an electrode (with a Gortex™ membrane) as it took to transfer the same quantity of air through the Gortex™ membrane only.

Thus, in some particular example 3D electrodes according to present embodiments, an advantage is that the 3D electrodes have improved permeability to air, or are substantially permeable to air, whereas conventional 3D electrodes are less so. That is, in one example, the air permeability of the 3D electrode is similar to, about equal to, the same as, or is substantially similar to, substantially about equal to, or substantially the same as, the air permeability of the gas permeable material (e.g. polymer membrane).

Figure 4:
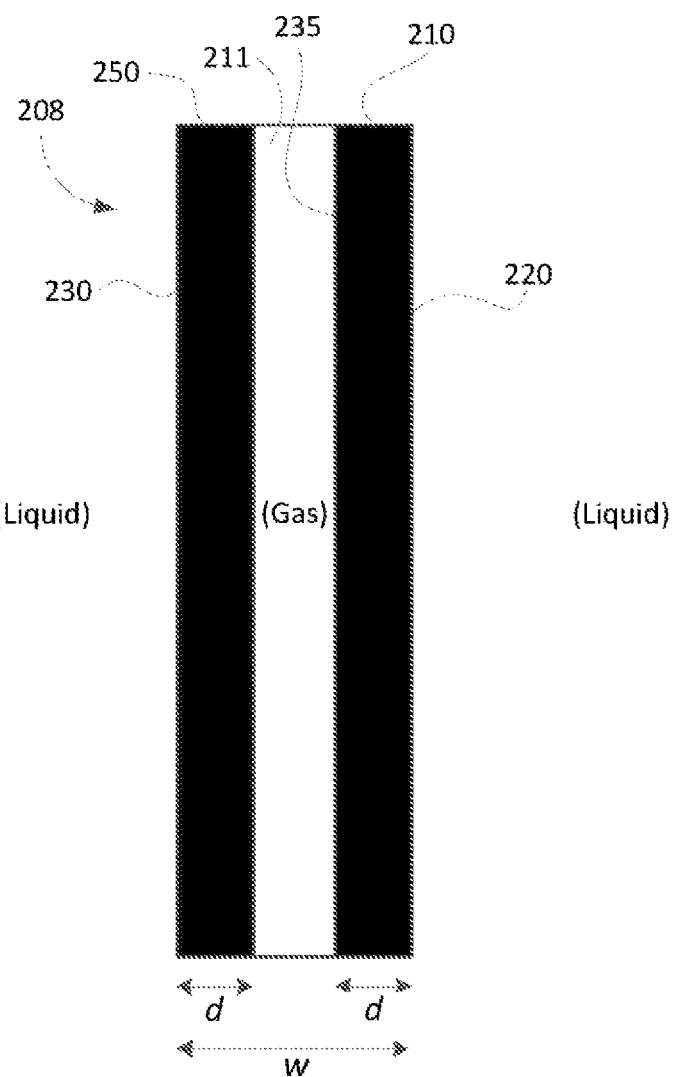
FIG. 4 depicts a schematic side view of an example GDE in which the two outer surfaces are both conductive (not to scale).

FIG. 4 schematically illustrates a GDE 208 in which a gas permeable material, such as a gas permeable polymer layer, has been laminated with, or attached to a porous conductive material, such as a conductive metallic layer, on both of its sides. The second conductive layer 250 may be applied to the GDE 208 at the same time as the first conductive layer 220. Alternatively the second conductive layer 250 may be applied after the first conductive layer 220 is applied. The same means of fabrication described in the earlier examples, or other means, may be used to generate the double-sided GDE 208.

Regardless of its method of manufacture, the effect of having metallic layers, regions or coatings on both sides of the GDE 208 is to make the central, non-conductive core or region 211, also a channel along which gases can pass. The outer metallic layers, regions or coatings face the liquid phase (e.g. in one example water).

The resulting membranous gas channel 211 within the body of such a double-sided gas diffusion electrode 208 may be remarkably permeable to gases. That is, the resulting gas channel may be able to accommodate and carry unexpectedly large quantities of gas even at atmospheric pressure. For example, in a particular but non-limiting application, when acting as a cathode in a water electrolysis cell operating at a current density of about 10 mA/cm$^2$ (which results in the generation of 1000 liters of hydrogen per day per square meter of electrode geometric surface), such a double-sided gas diffusion electrode 208 can extend up to about 2.5 meters away from an attached hydrogen collection apparatus without the inner gas channel of the electrode 208 becoming saturated and unable to carry more hydrogen at any point along its length. Such a double-sided GDE 208 may be used by dipping into a solution of electrolyte, with gas fed to or from the non-conductive central region or core 211.

Novel Properties of Example Gas Diffusion Electrodes (GDEs)—the Effect of Pressure and Temperature on Energy Efficiency and Flooding A feature of example GDEs of the present embodiments is that they allow for the application of a higher pressure to the liquid electrolyte than is present on the gases in the GDE. High liquid pressures (relative to the corresponding pressure of the gas on the gas-facing side of the GDE) often have the effect of improving the energy efficiency of electrochemical reactions. By contrast, conventional GDEs typically can only deal with very low liquid pressures before they flood (and thereby become inoperable).

For example, GDEs containing as their polymer layer, a General Electric Company PTFE membrane with average pore size 0.2 μm (used for membrane distillation in the water purification industry), are typically able to withstand up to about 3.4 bar of liquid pressure before they flood. This is because the PTFE membrane has a wetting pressure (or "water-inlet" pressure) of 3.4 bar.

Thus, an electrochemical cell employing such GDEs may have its liquid electrolyte pressurised up to 3.4 bar higher, in this case, than the pressure of the gases in and on the gas-facing sides of the GDEs. Many electrochemical processes involving gas-to-liquid or liquid-to-gas transformations are favourably affected by differential pressures of this type. Such a large pressure differential may therefore have the effect of substantially increasing the energy efficiency of the half-reaction which occurs at the GDE electrode. That is, one may achieve a particular rate of production at a lower applied cell voltage than was otherwise needed.

By contrast, conventional GDEs have wetting pressures that are said not to exceed 0.2 bar, meaning that they readily allow electrolyte to leak even at very mild liquid pressures. The option to apply higher differential pressures above 0.2 bar to liquid electrolytes in such cases, is therefore not available.

Thus, in one example embodiment, an electrochemical cell employing a GDE can have its liquid electrolyte pressurised to at least 0.2 bar and up to about 3.4 bar higher than the pressure of the gases in and on the gas-facing sides of the GDE.

A second feature of example GDEs of the present embodiments is their unusual properties at increasing temperatures. One effect of higher temperatures is to increase the amount of water vapour within a GDE and therefore also to increase the potential for condensation of that water vapour (flooding) within the GDE. An example GDE, with a high wetting pressure of, for example, 3.4 bar, is far less easily wet (if not being, effectively un-wettable) than a conventional GDE with a wetting pressure of 0.1 bar. For this reason, the conventional GDE will be at greater risk of flooding with increasing temperature than a GDE of the present embodiments with a higher wetting pressure (e.g. 3.4 bar).

Thus, cells employing example GDEs of the present embodiments may have their liquid electrolyte heated to higher temperatures than those having conventional GDEs, without risk of flooding the GDE. For many electrochemical processes, higher temperatures have the effect of improving the energy efficiency of the half-reaction at the electrode and thereby the increasing the energy efficiency of the overall process. Moreover, most electrolytic cells are "self-heating" in that the excess energy which must be applied to drive the reaction, is released as heat.

Example 1: Fabricating GDEs Using Deposition of Conductive Metals

In other examples there are provided 3D electrodes/GDEs which include a gas permeable material and a porous conductive material partially coating the gas permeable material. Referring back to FIG. 3 to illustrate this electrode structure, the porous conductive material penetrates the gas permeable material to a depth (d) less than the thickness (w) of the gas permeable material. For example, the depth is between about 5 nanometers to about 0.4 millimeters, dependent on sufficient thickness of the gas permeable material, e.g. gas permeable membrane. Alternatively, in another preferred form, the depth is between about $1/100,000^{th}$ to about $1/1.5^{th}$ of the thickness of the gas permeable material.

A conductive layer is formed at one surface of the 3D electrode and a non-conductive layer is provided or formed at the other, opposing, surface of the 3D electrode/GDE. The conductivity of the 3D electrode thus varies along the thickness of the 3D electrode. The conductive layer is gas permeable and at least partially liquid permeable, whereas the non-conductive layer is gas permeable and liquid impermeable, during normal operational use of the electrode. The conductive layer is part of an outer surface of the 3D electrode and is relatively less hydrophobic than the gas permeable material, whereas the bulk 3D electrode is gas breathable and liquid impermeable.

In other example forms: when used as a GDE, a three-way solid-liquid-gas boundary is formed within the 3D electrode; the solid-liquid-gas boundary is narrow in macroscopic width compared to the thickness of the 3D electrode or the gas permeable material. For example, the solid-liquid-gas boundary may be up to 850 nm wide.

Generally, for the examples discussed here, there is provided a process for preparing a 3D electrode or a GDE, comprising the steps of: a fabrication step to fabricate the 3D electrode or a GDE, including determining or setting a width of a three-phase solid-liquid-gas boundary, preferably where the width is narrow in relation to the width of the 3D electrode or a GDE; and an operation step to operate the 3D electrode or a GDE, preferably in a cell, at low current density, for example from 1 mA/cm² to 500 mA/cm², or from 1 mA/cm² to 200 mA/cm², or from 1 mA/cm² to 100 mA/cm², inclusively.

Referring back to FIG. 3 as a structural illustration for this alternative example, where the metallic and/or binder material has penetrated the pores of the non-conductive layer or region 211 the conductive layer or region 210 closest to the interface 235 or boundary region may also have a pore structure and other properties (e.g. hydrophobicity, wetting, and gas/liquid permeability), that are essentially identical, or, at least, very similar, to that of the non-conductive layer or region 211. In such a case, the boundary region or interface 235 between the layers or regions 210, 211 is not so much characterised by a structural change, as by an electrical change. It is, effectively, only a boundary region or interface of electrical conductivity. On one side of boundary or interface 235, layer or region 210 is conductive or somewhat conductive, whereas on the other side of boundary or interface 235, layer or region 211 is non-conductive. Moreover, on both sides of the boundary, boundary region or interface 235, the pores are uniform and small (about 0.2 micron in this case, although smaller pores can be obtained using other membranes). For this type of example 3D electrode, there is a substantially uniform or highly uniform pore structure and distribution, especially about the conductive-non-conductive boundary, which can be readily varied by merely selecting a different membrane to use as a gas permeable material. Important other properties (e.g. hydrophobicity, wetting, and gas/liquid permeability) are also unchanged on both sides of the interface 235.

The gas permeability of the conductive layer or region 210 is, moreover, either identical to or greater than that of the non-conductive layer or region 211 (except, of course, in the non-optimum case where the membrane has been blocked by an over-thick application of the conductive layer). Thus, gases may readily and uniformly pass through the electrode 205 (in this alternative example). The gas permeability of the 3D electrode 205 is, additionally, readily characterizable, being created by and being substantially the same as that of the uncoated gas permeable material, for which gas permeability data may routinely exist.

The liquid permeability of a 3D electrode depends largely or even entirely on the gas permeable material and the liquid with which it interacts. A hydrophilic polymer allows a hydrophilic liquid to pass through evenly and uniformly. The same is true for a hydrophobic polymer interacting with a hydrophobic liquid. In the case where there is a mismatch between the polymer and the liquid, an interface is created between the liquid and the 3D electrode. The extent and nature of that interface depends on the materials involved.

In further various examples, the wetting pressure for the GDEs is the same as that of the polymer layer or membrane used (for example the General Electric Company membrane of 0.2 μm average pore size), which is about 3.4 bar. Thus, only upon the application of 3.4 bar of pressure on the liquid side does liquid water penetrate and pass through the membrane, thereby flooding the membrane. By contrast, all other GDEs known to the inventors have wetting pressures that do not exceed 0.2 bar.

In various further examples: a porous conductive material or layer is provided at least partially within the gas permeable material; the porous conductive material or layer is associated with the gas permeable material; the porous conductive material or layer is located on and within the gas permeable material; and/or, the gas permeable material is located on and within the porous conductive material or layer. Preferably, though not necessarily, the conductive material is a metal, which after being applied is in the form of the porous conductive material. For example, the conductive material forming the porous conductive material can be Nickel. Alternatively, the metal could be Ti, Cr, Pt, Cu, Pb, Sn. Co, Mn, Au or Ag. Further, the porous conductive material could be formed of carbon black particles.

In further examples, the depth (d) of the conductive layer or portion is in the range of about 1 nm to about 10 μm, or about 50 nm to about 1 μm, or about 50 nm to about 500 nm. In a specific example, the porous conductive material is formed of Nickel, the gas permeable material is a 0.2 micron PTFE membrane and the depth is greater than 0 and less than about 850 nm.

In an example method of fabricating this form of 3D electrode, the steps include selecting a gas permeable material, for example with a substantially uniform pore size, and then applying, as a calibrated step, a conductive material to partially coat the gas permeable material, thereby forming a porous conductive material. The porous conductive material penetrates the gas permeable material to a depth less than the thickness of the gas permeable material. The calibrated step can include: a particular mode of application, a particular time or period of application; a particular electrical current or range of current of application; a particular temperature or range of temperature of application; and/or a particular circumstance or range of circumstances of application. The ideal conditions by which the calibrated deposition is performed, are typically determined by a program of study to realise a suitably narrow and well-defined solid-liquid-gas boundary in the desired range of widths, such as from 50 to 850 nm width. In one example, the conductive material can be Nickel and can be applied by vacuum deposition at a loading of greater than about 0.455 g/m² and less than about 3.64 g/m². Preferably, in this particular example, the Nickel is provided at a loading of about 1.82 g/m², which has the effect of imparting the electrode with unexpectedly amplified electrochemical properties when operated at a current density of 10 mA/cm² in the manufacture of: (i) pure oxygen from air oxygen, (ii) hydrogen peroxide from aqueous alkaline solution, or (iii) electrical potential and current in an alkaline fuel cell (or a direct methane fuel cell when a coating of Pt is used having 100 nm thickness).

Calibrated or careful application of one or more electrically conductive materials to gas permeable materials, for example porous polymer membranes, using controllable coating techniques can be used to produce 3D electrodes. When formed in a calibrated manner, one or more conductive layers may form part of a 3D electrode with unexpected and improved electrochemical performance, especially relative to other 3D electrodes and to the cost of manufacture. Further layers, for example including catalytic or other materials, can be conveniently added to, or formed upon the one or more conductive layers to produce more complex 3D electrodes that are practical and useful in electro-energy or electro-synthetic applications.

Example gas permeable or breathable 3D electrodes can be formed by depositing a conductive material or layer on a gas permeable material and, optionally, subsequently depositing a catalyst on the conductive material or layer. In one example, one could start with a gas permeable non-conductive material and then form the conductive material or layer on the gas permeable non-conductive material, and thereafter, deposit one or more catalysts.

In the case of an example 3D electrode manufactured in this manner, and referring back to the structure illustrated in FIG. 3, a gradual change in hydrophobicity exists in moving from the outside surface 220 through the conductive layer or region 210 which may penetrate the gas permeable material to depth d. The outer metal-binder surface 220 is relatively less hydrophobic, but this becomes more hydrophobic on moving into the non-conductive layer or region 211 toward the highly hydrophobic, non-conductive surface 230. The distance over which this hydrophobicity changes may be small, in one example being effectively only the depth into which the binder material penetrates the gas permeable material, for example in the case of ePTFE pore structure about 0.1-0.8 µm. This is narrower than the depth d, which defines or approximates the thickness of the conducting layer (for example about 8 pin to about 120 µm in some examples).

Thus, for this particular 3D electrode, a liquid solvent like water is likely able to partially penetrate at least some of the way into the conductive outer layer or region 210, which in one example form may be provided by applying or depositing a metallic coating. But water will be repelled and unable to penetrate into the highly hydrophobic interior. The liquid is therefore limited to, in one example the about 0.1 µm to about 0.8 µm thick outermost portion of the ePTFE, which has a high internal surface area, most of which may be conductive (after attachment of the metallic coating). The ingress of liquid water into the electrode 205 is therefore tightly controlled and a solid-liquid-gas boundary is created within, in one example, the outermost layer of about 0.1 µm to about 0.8 µm in depth. At this interface, gas from the non-conductive side 230 of the electrode 205 encounters liquid ingression from the outside of the membrane, at the conductive, metallized region.

According to various aspects provided by way of example:
(1) Carefully calibrated application of one or more conductive materials to gas permeable materials, such as porous polymer membranes, using controllable coating techniques can produce 3D conductive electrodes of remarkable and unexpected robustness, activity, and electrochemical area per unit volume, and which, when configured for gas-to-liquid and/or liquid-to-gas processes, display uniquely well-defined, narrow, and stable three-way solid-liquid-gas boundaries;
(2) When applied in a calibrated manner, conductive layers of this type constitute the formation of a 3D electrode with unexpected and amplified electrochemical performance, especially relative to other 3D electrodes and to the cost of manufacture;
(3) Additional layers including catalytic or other materials may be conveniently added to, or formed upon the conductive one or more layers to yield more complex 3D electrode structures that are practically useful in, especially, electro-energy or electro-synthetic applications;
(4) The availability of 3D electrodes, for example fabricated as described in points (1)-(3) above, makes viable or improves the practicality of a range of electro-energy and electro-synthetic applications. Such applications are typically unviable or relatively less practical using conventional fixed-bed or gas diffusion electrode technologies.

In various example forms, the coating techniques include but are not limited to metal vacuum-coating, sputter-coating, dip-coating, electroless- and electro-coating, powder-coating, and the like. In various example forms, the catalytic or other layers are applied by techniques, including but not limited to: electro- or electroless-coating, powder-coating, dip-coating, vacuum-coating, and the like. While coating techniques such as these have been previously applied to membranes which have subsequently been used to facilitate electrocatalytic transformations, the inventors have found that such metal-coating can be optimised in a different way, which provides for novel and improved catalytic properties, especially, but not exclusively, when operated at low current density. The unique mode of optimisation in such cases is directed at achieving a well-defined and narrow solid-liquid-gas boundary during operation as a GDE, such as having a macroscopic or maximum width of from about 50 to about 850 nm. Optionally, the metal-coated materials or membranes may be further coated with other particulate materials, slurries or coatings, including but not limited to materials that may comprise, wholly or in part, of electrochemically active ingredients. Such electrochemically active ingredients may include but are but not limited to: (a) electrocatalysts, (b) conductors, (c) current collectors, and the like.

Optionally, but preferably, the 3D electrode is flexible. Optionally, but preferably, the gas permeable material is made at least partially or wholly from a substance that is flexible, for example at least partially or wholly from a polymer or a combination of polymers, for example PTFE, ePTFE, polyethylene, polysulfone or polypropylene. The polymer itself may or may not be gas permeable. For example, the polymer itself may not be gas permeable but a structure or membrane formed from the polymer is gas permeable.

Example 2: Fabricating GDEs Using Lamination

In another specific example, an expanded PTFE (ePTFE) membrane manufactured by General Electric Company for the water treatment industry (pore size 0.2 micron) had a fine nickel mesh (200 line per inch; manufactured by Precision eForming Inc.) laid down upon the membrane. The mesh was then carefully lifted, starting at one edge and a layer of a binder material (15% Nafion in alcohol/water; supplied by Ion Power Inc., containing 10% by weight of carbon black, supplied by Sigma-Aldrich) was applied to the membrane surface. The mesh was thereafter released and allowed to contact the coated membrane. After leaving to dry for 4 hours at 60° C., the mesh was adhered to the surface of the PTFE membrane. This fabrication method may be amended in several ways. The binder material may be applied or painted over the unconnected mesh and the membrane and then dried, causing the mesh to adhere to the membrane. Alternatively, the binder material may be separately applied to the membrane surface and the mesh, with the coated, wet membrane and mesh then married up and dried.

Further aspects and details of example electrodes that can be utilised as GDEs can be found in the Applicant's concurrently filed PCT patent application "Composite Three-Dimensional Electrodes and Methods of Fabrication" filed on 30 Jul. 2014, which is incorporated herein by reference.

Example 3: Deploying Example Embodiment GDEs in Industrial Applications

The 3D electrodes being applied as GDEs allows a new type of electro-synthetic (i.e. electrochemical) or electro-energy cell, e.g. fuel cell, to be achieved. The cell includes a liquid electrolyte and at least one gas diffusion electrode as discussed above. The GDE in use can operate as a gas depolarized electrode and includes a gas permeable material that is substantially impermeable to the liquid electrolyte, during normal operational use of the electrode, as well as a porous conductive material provided on a liquid electrolyte-facing side of the at least one gas diffusion electrode. The porous conductive material can be attached to the gas permeable material by being laminated to the gas permeable material. Alternatively, the porous conductive material is attached to the gas permeable material by being coated on at least part of the gas permeable material.

The GDE and the materials or layers used to form the GDE are optionally, but preferably, flexible. This advantageously allows the GDE, and reactors or cells which include the GDE, to be bent and wound. In order to form spiral wound devices, a multi-layered arrangement of flat-sheet membranes may be rolled up into a spiral wound arrangement. The spiral wound arrangement may then be encased in a casing, which holds the spiral-wound element in place within a module whilst allowing for electrolyte to transit through the module. Alternatively and optionally, the multi-layered electrochemical reactor in a flat-sheet arrangement is not wound into a spiral, but deployed in its flat-sheet arrangement; that is the electrochemical reactor is a flat layered arrangement. An advantage of this cell arrangement is that it provides for high density of construction and may thereby provide an inexpensive way of deploying gas diffusion electrodes in an electrochemical reactor or cell.

In another embodiment there is provided an electrochemical reactor, comprising a plurality of hollow fibre electrodes (as either or both of cathode or anode) and a plurality of other electrodes (as the opposite electrode). A plurality of hollow fibre cathodes comprise a hollow fibre gas permeable, but electrolyte-impermeable material having a conductive layer, that may include a catalyst. A plurality of hollow fibre anodes comprise a hollow fibre gas permeable membrane having a conductive layer that may include a catalyst.

Example 4: Utilising GDEs with Wetting Pressures/Bubble Points Above 0.2 Bar

GDEs of this type or class may be very useful in industrial electrochemical reactions when embodiments of the method and/or electrochemical cell are applied. The resulting improvement in energy efficiency or other benefits that are typically realised originate in two key features which must be created and maintained in GDEs in order to achieve maximal efficacy:

a. The three-way solid-liquid-gas interface within the GDE should be maintained in a well-defined, narrow, and/or stable state during operation. The higher the quality of this interface and its reproducibility, the more electrochemically and catalytically active the GDE is likely to be. This is because gas-liquid reactions depend critically on a clear and invariant interface.

b. The electrode face of the GDE should be maintained as bubble-free or substantially free of new bubble formation, during operation. This is because bubbles at the electrode surface hinder reactants from reaching the surface and products from departing from the surface (the bubbles "mask" the electrode surface). Additionally, bubbles displace electrolyte from between the electrodes (i.e. they replace electrolyte with gaseous voids). This has the effect of potentially greatly increasing the solution resistance, resulting in wasteful energy consumption.

Embodiments of the method and/or electrochemical cell help to improve, create and/or maintain the above features, as best possible for the GDEs used. For illustrative purposes only, we describe examples of some representative case where the method and/or electrochemical cell helps to create and maintain the above features in a GDE with a wetting pressure and/or bubble point of more than 0.2 bar.

In one example, the method and electrochemical cell may help maintain the quality of the three-way solid-liquid-gas interface, whilst still creating conditions that are maximally advantageous for the reaction itself. Thus, consider a reaction which is most advantageously carried out at very high absolute gas pressure. Normally it would be extremely difficult to apply a very high gas pressure through a GDE whilst still maintaining the gas-liquid interface. However, example embodiments allow for high or extremely high gas pressures, by providing that the liquid phase is pressurised such that the differential pressure of the gas phase over the liquid phase does not reach the bubble point. In this way, the quality of the gas-liquid interface is maintained and, indeed, provides a means to create and maintain the gas-liquid interface even at high or very high applied gas pressures.

In another example, the method and/or electrochemical cell helps suppress bubble formation at the GDE for the case of an electrochemical process where a large differential pressure of the liquid side over the gas side, is preferred or optimum. This may arise when a reactant chemical species in the liquid electrolyte is transformed electrochemically into a gaseous product at the electrode surface of the GDE. In such a case, a high pressure differential of the liquid side over the gas side will typically have the effect of increasing the threshold partial pressure of the gas at the electrode surface required to create and hold up a bubble in the liquid electrolyte. This threshold partial pressure will, theoretically, be increased by the same amount as the differential pressure. For example, consider the situation where, at atmospheric pressure, bubbles are formed in the liquid electrolyte at the conductive surface of a GDE when the gas partial pressure at that surface reaches 5 bar. Now consider the situation where 2 bar of pressure is applied to the liquid phase, while the gas phase is maintained at atmospheric pressure. In order to form bubbles at the electrode surface, the gas partial pressure at the surface would now have to be more than 7 bar (=5 bar normally+2 bar additional applied pressure). In making bubble formation more difficult, the product gas is thereby instead encouraged to migrate directly from the electrode surface through the gas permeable, liquid-impermeable portion of the GDE to its gas-facing side.

The method and/or electrochemical cell may similarly help suppress bubble formation at the GDE in an electrochemical process where a reactant gas is transformed into a liquid-product at the GDE. In this case, the reactant gas migrates from the gas side through the GDE to its electrically conductive surface to there be transformed into the liquid-phase product. In such cases, bubbles are formed at the electrode surface only when the gas pressure exceeds the so-called "bubble point" of the GDE. The effect of increasing the pressure on the liquid side of the GDE is then, effectively, also to increase the bubble point by the same amount and thereby make bubble formation less likely. For example, the bubble point of the above-cited GDE utilizing expanded PTFE (ePTFE) membrane with 0.2 µm pores, is in the region of 2 bar. Thus, if, during a sudden and unexpected gas pressure swing, the GDE gas pressure were to reach 2 bar while the GDE liquid pressure was atmospheric, bubbles will form at the electrode surface. However, if the liquid was pressurised to 3 bar, then bubbles will form at the electrode surface only if the GDE gas pressure were to unexpectedly reach 5 bar (=2 bar normal bubble point+3 bar additional applied pressure). Thus, high pressures on the liquid electrolyte relative to the gas side of the GDE may discourage and suppress bubble formation in this case also.

In avoiding or suppressing bubble formation in one of the above ways, one may therefore:
(i) increase the inherent efficiency of the liquid-to-gas chemical transformation, and/or
(ii) minimize the negative effects that are typically associated by the presence of bubbles at electrode surfaces in electrochemical cells.

For example, GDEs may be conveniently and reliably fabricated with tiny (less than about 500 nm, or less than about 250 nm) and uniform pores that are not easily or inexpensively achieved in the fabrication of conventional GDEs. For example, the average pore size can be from about 50 nm to about 500 nm, or from about 100 nm to about 500 nm, or from about 100 nm to about 250 nm, or in more specific examples about 0.1, 0.2, 0.3, 0.4 or 0.5 microns. Additionally, the desired pore size and other properties can be readily varied by simply selecting a different polymer membrane for adaption into a GDE. Membranes with a wide variety of pore sizes and uniformly-distributed physical properties are readily available. By controlling the pore size of the substrate polymer, one may also control important physical properties of the GDE, such as the wetting pressure, the bubble point, and its permeability to gases.

GDEs of this class or type typically have substantially the same wetting pressure as that of the gas permeable polymer membrane substrate used. For example, a PTFE membrane (available from General Electric Company for membrane based distillation) having average pore size 0.2 µm has a wetting pressure of 3.4 bar. A GDE containing such a membrane as the non-conductive, gas permeable, polymer layer (the gas permeable material), next to or on which the metallic material, element or coating (the porous conductive material) is located, will typically also display a wetting pressure of about 3.4 bar. Thus, liquid water will only penetrate and flood the GDE upon the application of 3.4 bar of pressure by, or on the liquid. Moreover, PTFE is resistant to, and unaffected by caustic solutions, such as the 32% NaOH solutions used at the cathode in chlor-alkali cells. Metallic elements laminated with, attached to or coated on the PTFE membranes, such as nickel or nickel meshes, are also resistant to and unaffected by caustic solutions.

The ability to produce electrodes of relatively large size. For example, for commercial applications, electrodes can be readily produced having a width and/or a length of greater than or equal to 0.05 m, 0.1 m, 0.2 m, 0.3 m, 0.4 m, 0.5 m, 1 m, or 2 m. In another example electrodes can be readily produced of about 0.05 m, about 0.1 m, about 0.2 m, about 0.3 m, about 0.4 m, about 0.5 m, about 1 m, about 2 m, or larger in width and/or length. In an application where an electrode is rolled or spiral-wound, the flat electrode before rolling may preferably have a width of about 0.05 m or greater, about 0.1 m or greater, about 0.2 m or greater, about 0.3 m or greater, about 0.4 m or greater, about 0.5 m or greater, about 1 m or greater, about 2 m or greater, and a length of about 0.5 m or greater, about 1 m or greater, about 2 m or greater, about 3 m or greater, about 4 m or greater, about 5 m or greater, about 10 m or greater. The rolled or wound electrode may have a diameter of about 0.05 m or greater, about 0.1 m or greater, about 0.2 m or greater, about 0.3 m or greater, about 0.4 m or greater, about 0.5 m or greater, or even larger. This relatively large size distinguishes many previous electrodes that can only be produced in a small size, for example up to the order of 0.01 m in size. The difference in size scale is not a trivial factor since many small electrodes cannot be simply scaled up in size. For example, in relatively small cells having small sized electrodes, it is not required to have or consider a high electrical conductivity in the cell/electrode, because the distances involved are small, so the associated resistances are relatively small. In contrast, in larger scale cells/electrodes, such as the present example, this issue is much more challenging and higher conductivity is required along very good conduction pathways. Hence, a small scale electrode structure cannot typically and simply be scaled up to a large scale electrode.

Further aspects and details of example electrodes that can be utilised as GDEs to improve or enhance managing electrochemical reactions can be found in the Applicant's concurrently filed PCT patent applications "Composite Three-Dimensional Electrodes and Methods of Fabrication" filed on 30 Jul. 2014, "Modular Electrochemical Cells" filed on 30 Jul. 2014, and "Electro-synthetic or Electro-energy Cell with Gas Diffusion Electrode(s)" filed on 30 Jul. 2014, which are all incorporated herein by reference.

It is to be understood that these examples are illustrative only and that there are other ways in which the method and/or electrochemical cell promote improved or optimum reaction conditions within a variety of types of GDEs having wetting pressures and/or bubbles points above about 0.2 bar.

Example 5: Managing Electrochemical Reactions by Employing GDEs with Wetting Pressures/Bubble Points Above 0.2 Bar In one example there is provided a method for managing an electrochemical reaction in an electrochemical cell, which in use has a gas diffusion electrode positioned between a liquid electrolyte and a gas region. The method includes the steps of selecting the gas diffusion electrode to have a wetting pressure or a bubble point greater than 0.2 bar, and applying a pressure differential between the liquid electrolyte and the gas region that is less than the wetting pressure (in the case where the liquid pressure is greater than the gas pressure) or the bubble point (in the case where the gas pressure is higher than the liquid pressure).

In another example there is provided an electrochemical cell which includes a gas diffusion electrode having a wetting pressure or a bubble point greater than 0.2 bar, and the gas diffusion electrode positioned between a liquid electrolyte and a gas region. In use a pressure differential is applied between the liquid electrolyte and the gas region that is less than the wetting pressure (in the case where the liquid pressure is greater than the gas pressure) or the bubble point (in the case where the gas pressure is higher than the liquid pressure).

In another example, there is provided a method for managing an electrochemical reaction in an electrochemical cell. The electrochemical cell has a gas diffusion electrode positioned between a liquid electrolyte and a gas region. The method comprises applying a pressure differential between the liquid electrolyte and the gas region that is less than a wetting pressure (in the case where the liquid pressure is greater than the gas pressure) or the bubble point (in the case where the gas pressure is higher than the liquid pressure) of the gas diffusion electrode relative to the liquid electrolyte and a gas used or consumed in operation of the cell. The wetting pressure or the bubble point is greater than 0.2 bar.

A three-phase solid-liquid-gas interface is formed within the gas diffusion electrode. In one example, an excess pressure on a liquid electrolyte side of the gas diffusion electrode over a gas side of the gas diffusion electrode is less than the wetting pressure during use. In another example, an excess pressure on a gas side of the gas diffusion electrode over a liquid electrolyte side of the gas diffusion electrode is less than the bubble point during use. Preferably, the gas diffusion electrode is bubble-free or substantially free of bubble formation during use.

In another example, the gas diffusion electrode has a wetting pressure or a bubble point greater than or equal to 1 bar, and the pressure differential is less than 1 bar. In another example, the gas diffusion electrode has a wetting pressure or a bubble point greater than or equal to 2 bar, and the pressure differential is less than 2 bar. In another example, the gas diffusion electrode has a wetting pressure or a bubble point greater than or equal to 3 bar, and the pressure differential is less than 3 bar. In another example, the gas diffusion electrode has a wetting pressure or a bubble point greater than or equal to 4 bar, and the pressure differential is less than 4 bar. In another example, the gas diffusion electrode has a wetting pressure or a bubble point greater than or equal to 5 bar, and the pressure differential is less than 5 bar. In another example, the gas diffusion electrode has a wetting pressure or a bubble point greater than or equal to 6 bar, and the pressure differential is less than 6 bar.

In various other examples, the pressure differential is set to about 0.1 bar, about 0.2 bar or about 0.3 bar below the wetting pressure of the gas diffusion electrode when the liquid electrolyte has a higher pressure than the gas region. In various other examples, the pressure differential is set to about 0.1 bar, about 0.2 bar or about 0.3 bar below the bubble point of the gas diffusion electrode when the gas region has a higher pressure than the liquid electrolyte. In various other examples, the pressure differential is set to between about 1 bar to about 2 bar below the wetting pressure of the gas diffusion electrode when the liquid electrolyte has a higher pressure than the gas region. In various other examples, the pressure differential is set to between about 1 bar to about 2 bar below the bubble point of the gas diffusion electrode when the gas region has a higher pressure than the liquid electrolyte.

In another example there is provided a pressure measurement device, such as a pressure transducer, flow meter, pressure gauge, to measure the pressure differential. Also there can be provided a control device configured to adjust the pressure differential based on the measured pressure differential. For example the control device could be a processor, computing device or unit, digital or analog electronic device or circuit, integrated circuit, software or firmware, that controls pressure or flow changing or altering mechanisms, such as a valve. The control device could adjust or maintain the pressure differential to be a preselected value, for example as input or set by a user using a user interface or control panel. The control device could be configured to maintain the pressure differential to be less than the wetting pressure or the bubble point. The control device could be configured to adjust the pressure of the liquid electrolyte and/or configured to adjust the pressure in the gas region.

In yet another example, the gas diffusion electrode comprises: a non-conductive gas permeable material that is substantially impermeable to the liquid electrolyte, during normal operational use of the electrode; and a porous conductive material provided on a liquid electrolyte side of the gas diffusion electrode. The non-conductive gas permeable material is provided on a gas side of the gas diffusion electrode. The porous conductive material may be attached to the non-conductive gas permeable material by being laminated to the non-conductive gas permeable material. Alternatively, the porous conductive material may be attached to the non-conductive gas permeable material by being coated on at least part of the non-conductive gas permeable material.

In other examples, the gas permeable material has a characteristic pore size less than about 250 nm; or the gas permeable material has an average pore size of between about 100 nm to about 500 nm, or in more specific examples about 0.1, about 0.2, about 0.3, about 0.4 or about 0.5 micron. Preferably, the gas permeable material has a pore size that is substantially uniform. Substantially uniform pore size is intended to mean where less than 10% of the gas flow occurs through pores that are about 50 times or more larger than the average pore size.

Figure 5:
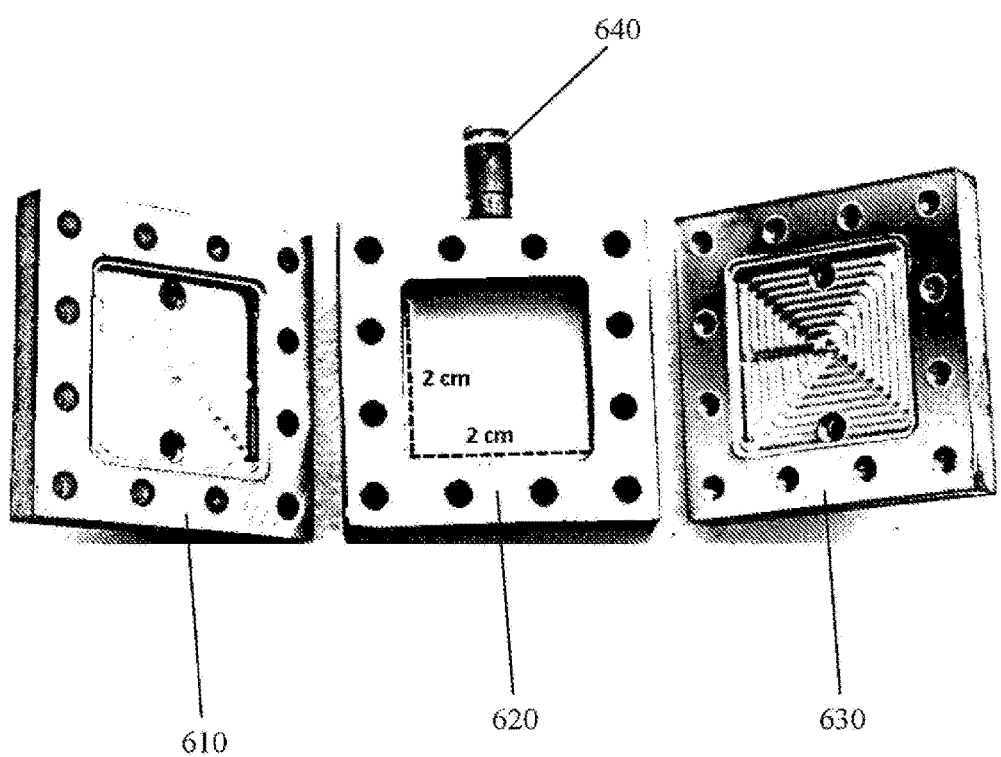
FIG. 5 depicts a disassembled example electrochemical cell used to study the effect of pressure differentials on electrochemical cells containing GDEs with 3.4 bar wetting pressures and 2 bar bubble pressures. An electrode is placed between the left-most component and the center component, and another electrode is placed between the right-most component and the center component, when assembled.
Figure 6:
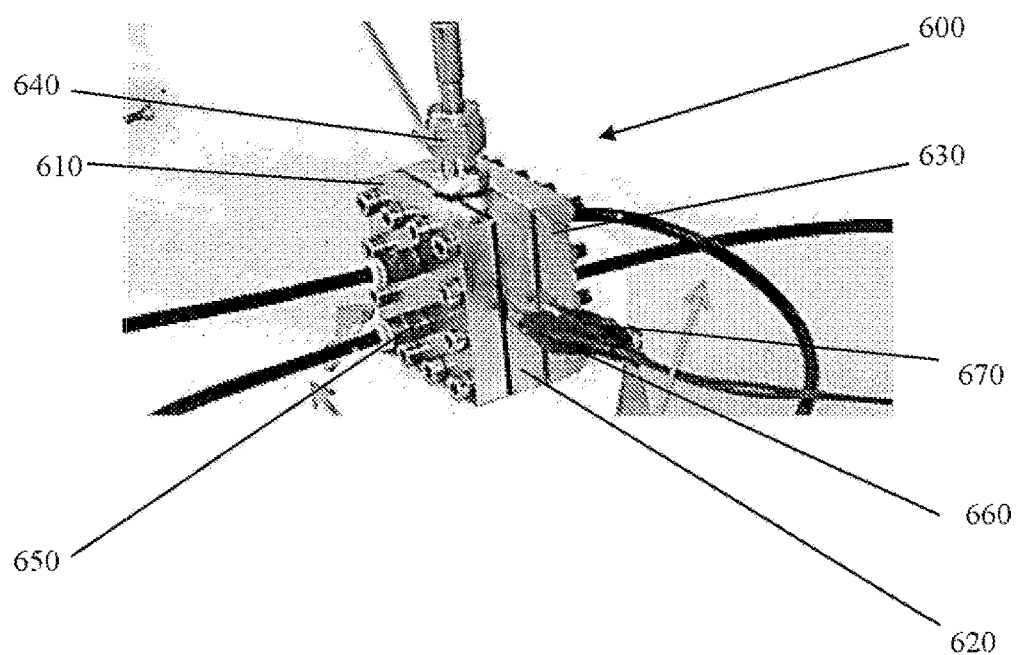
FIG. 6 depicts the cell from FIG. 5 when assembled and configured to contain two GDEs (having wetting pressures of 3.4 bar and bubble pressures of 2 bar each), and showing gas regulating attachments to a central liquid electrolyte chamber on one side of the GDEs, and to the outer gas chambers on the other sides of the GDEs.

Example 6: Managing an Electrochemical Reaction for the Example of a Water Electrolysis Reaction In this example an electrochemical reaction was managed by increasing the excess (differential) pressure of the liquid side over the gas side, up to and beyond the wetting pressure of the GDE, for the representative case of a water electrolysis reaction. To examine the different factors involved in maximising GDE performance, several studies were carried out using the example cell 600 depicted in FIGS. 5 and 6, equipped with identically sized anode and cathode GDEs of 4 cm² area, which had been fabricated by depositing a porous metallic element 20 (in this example 100 line-per-inch stainless steel mesh, coated with and laminated using a nickel nanoparticle catalyst containing 5% binder material being a porous polymer, such as a fluoropolymer-copolymer (e.g. Nafion™)) and a gas permeable, electrolyte-impermeable layer (a PTFE membrane from General Electric Company for membrane distillation, having average pore size 0.2 µm, a wetting pressure of 3.4 bar and a bubble point of 2 bar), as shown in FIG. 3.

Cell 600 includes first side section 610, middle section 620 and second side section 630, for example made of metal such as stainless steel, which can be bolted together. First gas regulator 640 transfers gas into/from an electrolyte chamber of the cell. Second gas regulator 650 transfers gas into/from a gas chamber of the cell. First electrical connection 660 attaches to one electrode and second electrical connection 670 attaches to another electrode, where one or both of the electrodes is a GDE.

The cell was then charged with an electrolyte of 6 M KOH and cell voltages of between 1.7 V and 2.5 V were applied over the electrodes, whilst applying pressures of up to 3 bar (=300 kPa) to the central liquid electrolyte chamber via regulator 640. The rate of the electrolysis reaction was measured by recording the current under the applied conditions.

When equivalent solid-state electrodes were used in the cell instead of the above GDEs at atmospheric pressure, the recorded currents were of the order of 0.17 mA/cm$^2$ (at 1.7 V) to 2 mA/cm$^2$ (at 2.5 V).

Figure 7:
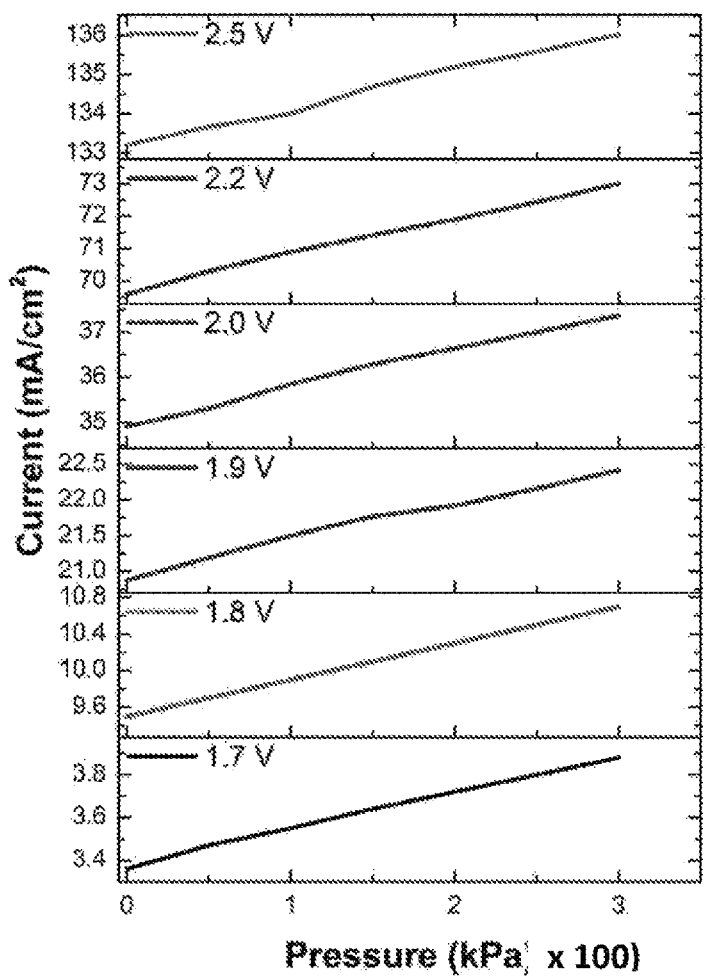
FIG. 7 depicts the effect on the electrochemically measured rate of reaction (left axis; in $mA/cm^2$) for a water electrolysis reaction in the cell of FIG. 6, as a function of the excess (differential) pressure on the liquid electrolyte relative to the gas side of the GDEs (bottom axis; in kPa).

FIG. 7 shows the obtained data using the above GDEs. As can be seen, the currents were substantially higher with the GDEs than with the equivalent conventional electrodes. Moreover, at all recorded voltages the current increased as the excess (differential) pressure of the liquid phase over the gas phase was increased. For example, at an equal, atmospheric pressure on both of the liquid and gas chambers (Pressure=0), a current of 133 mA/cm$^2$ was recorded at 2.5 V. When the liquid phase was then pressurised to 1 bar (=100 kPa) whilst maintaining the gas phase at atmospheric pressure, then the current rose to 134 mA/cm$^2$. At 2 bar (=200 kPa) for the liquid phase and atmospheric pressure for the gas phase, the current rose to 135 mA/cm$^2$. At 3 bar (=300 kPa) for the liquid phase and atmospheric pressure for the gas phase, the current rose to 136 mA/cm$^2$. Similar increases were seen for all of the different voltages applied.

This continued up to about 3 bar, whereafter at 3.4 bar and higher, liquid electrolyte penetrated and flooded the GDEs, completely stopping the reaction and yielding a zero current (as the gas-liquid interface was destroyed). Electrolyte also leaked into the gas chambers. This occurred because the wetting pressure of the GDE was 3.4 bar.

When the pressure differential was taken back below 3 bar, then the flooding stopped and the reaction current slowly re-established itself (as the three-phase solid-liquid-gas interface was re-established).

This example shows that the use of the GDEs improved the rate of the reaction and, by implication, the efficiency of the reaction. Moreover, the application of an increasing differential pressure to the liquid over the gas side of the GDEs, resulted in a progressively further increase in the rate of reaction. This continued up to the point where the applied differential pressure on the liquid side versus the gas side exceeded the wetting pressure of the GDEs, which resulted in flooding of the GDEs, destroying the gas-liquid interface and halting the reaction. A quick decrease in the applied differential pressure to back below 3.4 bar, re-established the gas-liquid interface, and re-started the reaction.

Example 7: Managing an Electrochemical Reaction for the Example of a Water Electrolysis Reaction In this example an electrochemical reaction was managed by increasing the absolute pressure of the liquid and gas sides of a GDE to 6.5 bar, whilst maintaining a differential pressure of the liquid side over the gas side of 0.5 bar, for the representative case of a water electrolysis reaction. The above experiment in Example 6 was repeated in a somewhat different way using a slightly modified GDE for the anode. The only difference was that the catalyst-binder combination in the anode GDE was augmented by additional 50% CoSO$_4$. Co$_3$O$_4$ is a catalyst of water electrolysis.

For this example, a constant excess (differential) pressure on the liquid over the gas side of the GDEs of 0.5 bar (=50 kPa) was maintained at all times. The pressure on the gas and liquid sides were then simultaneously increased in steps of 1 bar each.

Figure 8:
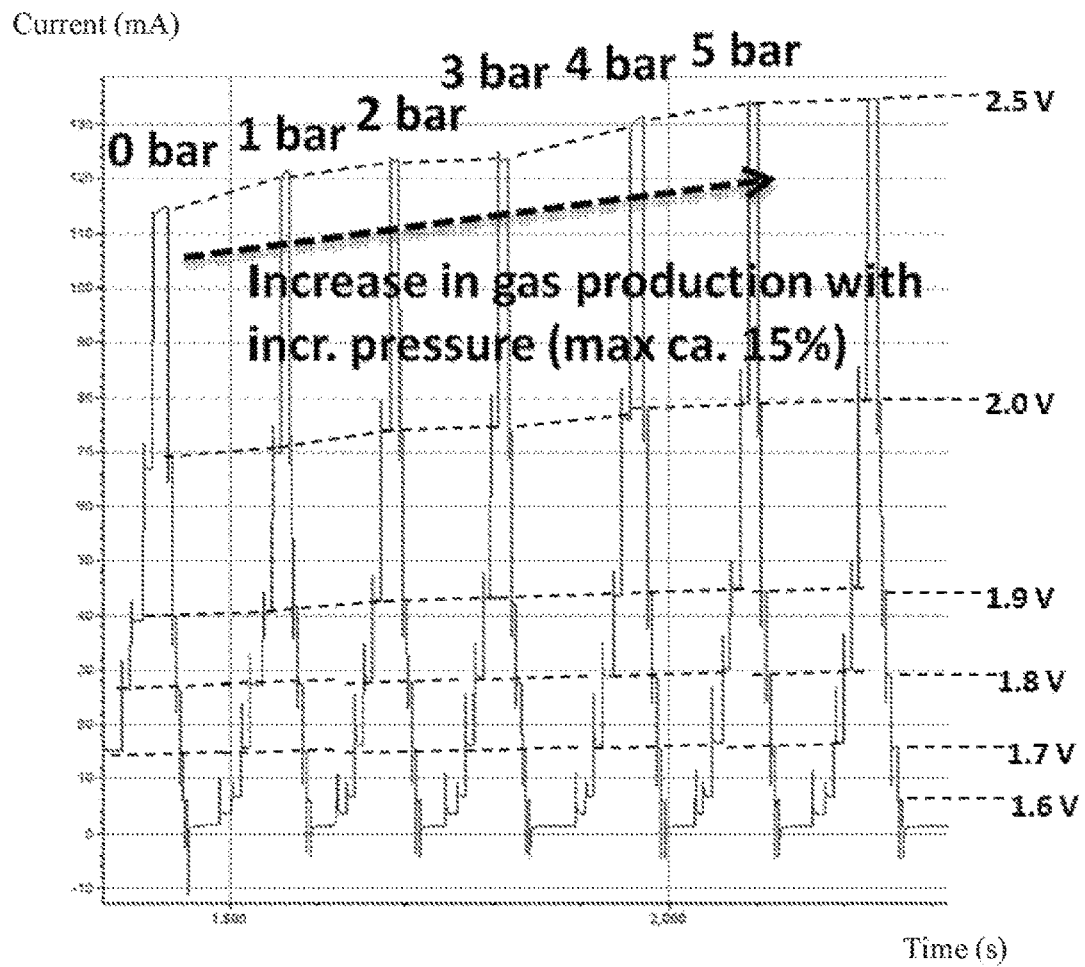
FIG. 8 depicts the effect on the electrochemically measured rate of reaction (left axis; in $mA/cm^2$) for a water electrolysis reaction in the cell of FIG. 6, as a function of the applied pressure on the liquid electrolyte, whilst maintaining a constant excess (differential) pressure of 0.5 bar on the liquid electrolyte relative to the gas side of the GDEs.

FIG. 8 shows the resulting data. The pyramidal trace on the far left of FIG. 8 was obtained at the different voltages shown when the pressure applied to the liquid side was 0.5 bar and the pressure applied to the gas side was 0 bar. The designation at the top of each trace shows the pressure applied to the gas side.

The next pyramidal trace to the right (—that is, the second pyramidal trace from the left) was taken when the pressure applied to the liquid side was 1.5 bar and the pressure applied to the gas side was 1 bar (marked on the Figure as "1 bar").

The next pyramidal trace to the right was taken when the pressure applied to the liquid side was 2.5 bar and the pressure applied to the gas side was 2 bar (marked on the Figure as "2 bar").

The next pyramidal trace to the right was taken when the pressure applied to the liquid side was 3.5 bar and the pressure applied to the gas side was 3 bar (marked on the Figure as "3 bar").

The next pyramidal trace to the right was taken when the pressure applied to the liquid side was 4.5 bar and the pressure applied to the gas side was 4 bar (marked on the Figure as "4 bar").

The next pyramidal trace to the right was taken when the pressure applied to the liquid side was 5.5 bar and the pressure applied to the gas side was 5 bar (marked on the Figure as "5 bar").

The right-most pyramidal trace was taken when the pressure applied to the liquid side was 6.5 bar and the pressure applied to the gas side was 6 bar (unmarked on the Figure).

As can be seen, the reaction rate, as measured by the current (left axis; in mA) increased as the absolute pressure on the electrochemical cell increased. Moreover, there was no flooding or even chance of flooding, since the differential pressure of the liquid over the gas side in all cases was only 0.5 bar, whereas the wetting pressure of the example GDE used was 3.4 bar. Thus, a very large margin of error existed to cater for unexpected and sudden pressure swings.

This example shows that the use of the GDEs improved the rate of the reaction and, by implication, the efficiency of the reaction. Moreover, the application of an increasing absolute pressure to the electrochemical cell, whilst maintaining an invariant excess (different) pressure for the liquid over the gas side of the GDEs, resulted in a still further increased rate of reaction. This continued up to at least 6 bar of applied pressure on the gas and 6.5 bar of applied pressure on the liquid electrolyte.

Example 8: Managing an Electrochemical Reaction for the Example of a Water Electrolysis Reaction In this example the electrochemical reaction was managed by increasing the absolute pressure of the liquid and gas sides of a GDE to 9 bar, whilst maintaining a differential pressure of the liquid side over the gas side of 1 bar, for the representative case of a water electrolysis reaction. The above experiment was repeated in a somewhat different format. The only difference was that 200 lines per inch nickel mesh without any catalysts, was used for the conductor-catalyst layers in both GDEs. Also a constant excess (differential) pressure of liquid over gas, of 1 bar (=100 kPa) was maintained throughout.

Figure 9:
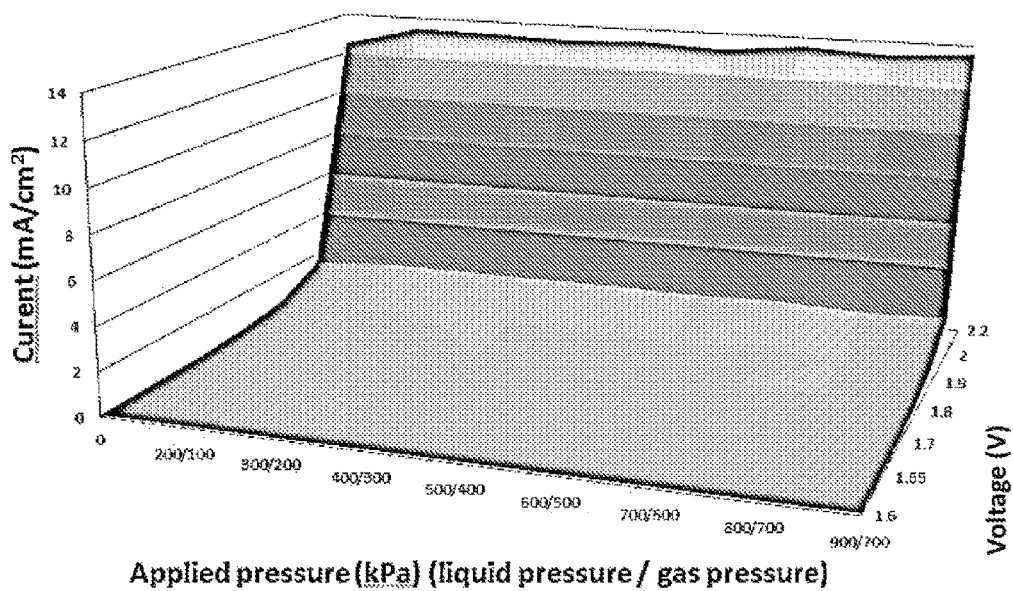
FIG. 9 depicts a 3D graph relating the effect on the electrochemically measured rate of reaction (left axis; in mA) for a water electrolysis reaction in the cell of FIG. 6, as a function of the applied pressure on the liquid electrolyte, whilst maintaining a constant excess (differential) pressure of 0.5 bar on the liquid electrolyte relative to the gas side of the GDEs (bottom axis; in kPa) versus the applied voltage (orthogonal axis; in V).

FIG. 9 shows a 3D graph of the data that resulted when the absolute pressure of the electrochemical cell was increased up to 9 bar (=900 kPa) for the liquid and 8 bar (=800 kPa) for the gas side of the GDEs.

As can be seen, there was a moderate increase with increases in the absolute pressure and the applied voltage.

This example shows that the use of the GDEs improved the rate of the reaction and, by implication, the efficiency of the reaction. Moreover, the application of an increasing absolute pressure to the electrochemical cell, whilst maintaining an invariant excess (different) pressure for the liquid over the gas side of the GDEs, resulted in a still further increased rate of reaction. This continued up to at least 8 bar of applied pressure on the gas and 9 bar of applied pressure on the liquid electrolyte.

Example 9: Using Flexible 3D Electrodes to Form a Spiral-Wound Cell or Device

As previously discussed, example 3D electrodes and GDEs can be flexible. The 3D electrodes or GDEs can be formed as anodes and cathodes for use in a variety of cells, devices or reactors. The 3D electrodes or GDEs can be stacked or layered, for example as alternating anodes/cathodes and with any required intervening spacer layers, insulating layers, gas channel layers, feed channels or the like. Selected edges of the 3D electrodes or GDEs can be sealed while other selected edges are left unsealed for gas or liquid ingress or egress, as required.

Figures 10, 11:
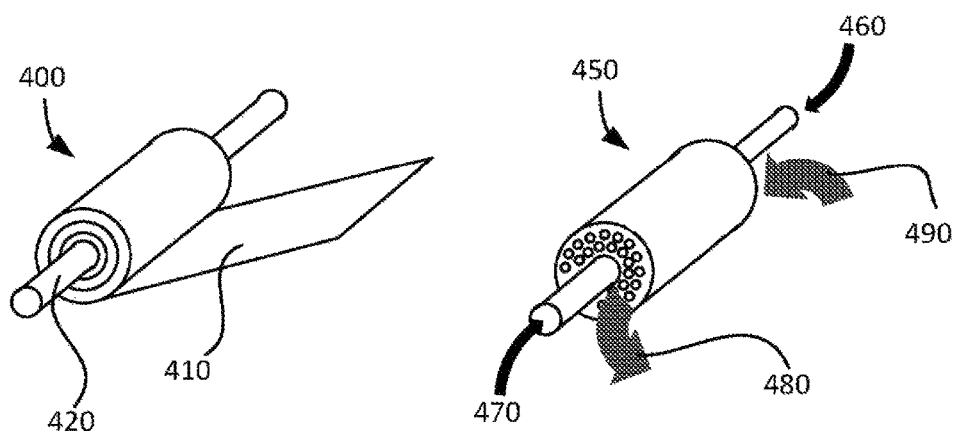
FIG. 10 schematically illustrates an example of how one or more flexible 3D electrodes, used as a GDE, can be rolled or spiral-wound.
FIG. 11 schematically illustrates an example of how flexible 3D electrodes, used as GDEs, for example after being stacked or layered as anode-cathode pairs, can be formed into an example spiral-wound cell or device.

FIG. 10 schematically illustrates an example partially produced spiral-wound cell, device or reactor 400. One or more flexible 3D electrodes or GDEs 410, for example a layered stack of flexible 3D electrodes or GDEs formed as anode-cathode pairs or series, can be rolled or spiral-wound about a central tube, conduit or section 420. Some applications may call for a single flexible 3D electrode or GDE to be rolled or wound.

FIG. 11 schematically illustrates an example of how flexible 3D electrodes or GDEs, for example after being stacked as anode-cathode pairs or series, can be formed into an example spiral-wound cell, device or reactor 450. To minimise the overall footprint of a cell, a multi-layered arrangement of flat-sheet flexible 3D electrodes may be rolled up into a spiral-wound cell 450. The spiral-wound cell 450 may then be encased in a casing, which still allows for electrolyte to transit through the cell 450. 3D electrodes or GDEs acting as anodes and cathodes can be attached to a central tube 420 in such a way that unsealed edges of the electrodes properly transport liquid/gases. For example, electrolyte can be introduced to the rolled 3D electrodes or GDEs at input edges 490, and electrolyte can exit the rolled 3D electrodes or GDEs at exit edges 480. Also for example, a gas or gases can be introduced to the rolled 3D electrodes or GDEs at gas input 460, and a gas or gases can exit the rolled 3D electrodes or GDEs at gas exit 470. The liquid and gas plumbing can vary depending on the specific structure or application. The liquid electrolyte and/or gas can be pressurized, or a pressure differential otherwise applied between the liquid electrolyte and the gas, as previously discussed.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

Optional embodiments may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that many modifications, changes, substitutions or alterations will be apparent to those skilled in the art without departing from the scope of the present invention.

The invention claimed is:

1. A method for managing an electrochemical reaction in an electrochemical cell, the electrochemical cell having a gas diffusion electrode positioned between a liquid electrolyte and a gas region, the gas diffusion electrode comprising a porous conductive material attached to a porous gas permeable polymer membrane having a wetting pressure greater than 0.2 bar, the method comprising:
applying a pressure differential as an excess pressure on the liquid electrolyte of at least 0.2 bar greater than a pressure in the gas region and that is less than the wetting pressure.

2. The method of claim 1, wherein a solid-liquid-gas interface is formed within the gas diffusion electrode adjacent a surface of the membrane.

3. The method of claim 1, wherein the gas diffusion electrode has the same wetting pressure as the gas permeable polymer membrane.

4. The method of claim 1, wherein the gas permeable polymer membrane is non-conductive.

5. The method of claim 1, wherein the porous conductive material is physically or chemically bonded to the gas permeable polymer membrane by a binder material, which binder material is a mixture comprising a catalyst.

6. The method of claim 1, wherein the wetting pressure is greater than 1 bar, and the pressure differential is at least 1 bar.

7. The method of claim 1, wherein the wetting pressure or the bubble point is greater than 2 bar, and the pressure differential is at least 2 bar.

8. The method of claim 1, wherein the wetting pressure or the bubble point is greater than 3 bar, and the pressure differential is at least 3 bar.

9. The method of claim 1, wherein the wetting pressure or the bubble point is greater than 4 bar, and the pressure differential is at least 4 bar.

10. The method of claim 1, wherein the wetting pressure or the bubble point is greater than 5 bar, and the pressure differential is at least 5 bar.

11. The method of claim 1, wherein the wetting pressure or the bubble point is greater than 6 bar, and the pressure differential is at least 6 bar.

12. The method of claim 1, wherein the pressure differential is maintained at 0.1 bar to 0.3 bar below the wetting pressure.

13. The method of claim 1, further comprising maintaining the pressure differential with a control device such that the pressure differential is maintained at a liquid electrolyte pressure less than the wetting pressure.

14. The method of claim 1, wherein the pressure differential is maintained at 1 bar to 2 bar below the wetting pressure.

15. The method of claim 1, wherein the gas permeable polymer membrane is an expanded polytetrafluoroethylene membrane.

16. An electrochemical cell comprising:
a liquid electrolyte in an electrolyte region;
a gas diffusion electrode comprising a porous conductive material attached to a porous gas permeable polymer membrane having a wetting pressure greater than 0.2 bar relative to the liquid electrolyte; and
the gas diffusion electrode positioned between the liquid electrolyte and a gas region, the liquid electrolyte being held at a pressure differential at least 0.2 bar higher than a pressure of the gas region and less than the wetting pressure of the gas permeable polymer membrane less than the wetting pressure.

17. The cell of claim 16, wherein the
gas permeable polymer membrane is non-conductive and is substantially impermeable to the liquid electrolyte; and
the porous conductive material is provided on a liquid electrolyte side of the gas diffusion electrode.

18. The cell of claim 17, wherein the non-conductive gas permeable material is provided on a gas side of the gas diffusion electrode.

19. The cell of claim 17, wherein the porous conductive material is attached to the non-conductive gas permeable material by being laminated to the non-conductive gas permeable material.

20. The cell of claim 17, wherein the porous conductive material is attached to the gas permeable material using a binder material.

21. The cell of claim 17, wherein the porous conductive material is coated on at least part of the non-conductive gas permeable material.

22. The cell of claim 20, wherein the porous conductive material is physically or chemically bonded to the gas permeable polymer membrane by the binder material, the binder material being a mixture comprising a catalyst.

23. The cell of claim 16, wherein bubbles of gas are not produced at the gas diffusion electrode.

24. The cell of claim 16, wherein the gas diffusion electrode includes a barrier layer that is substantially permeable to a gas produced or consumed by the gas diffusion electrode, but relatively less permeable or impermeable to transport of a reaction solvent in gaseous form.

25. The cell of claim 17, wherein the gas permeable polymer membrane has a characteristic pore size of 50 nm to about 500 nm and is formed of expanded PTFE.

26. The cell of claim 16, including a pressure measurement device to measure the pressure differential.

27. The cell of claim 26, including a control device configured to adjust the pressure differential based on a measured pressure differential.

28. The cell of claim 27, wherein the control device adjusts the pressure differential to be a preselected value.

29. The cell of claim 27, wherein the control device is configured to maintain the pressure differential to be less than the wetting pressure.

30. The cell of claim 27, wherein the control device is configured to adjust the pressure of the liquid electrolyte and/or the pressure in the gas region.

31. The cell of claim 16, wherein the gas diffusion electrode has a wetting pressure equal to the wetting pressure of the porous gas permeable polymer membrane.

32. The cell of claim 16, wherein the porous gas permeable polymer membrane is a previously formed non-conductive, porous, expanded polytetrafluoroethylene (ePTFE) membrane.

* * * * *